United States Patent [19]

Sugahara et al.

[11] 4,060,508

[45] Nov. 29, 1977

[54] STABILIZER COMPOSITION FOR CHLORINE-CONTAINING POLYMERS

[75] Inventors: Yujiro Sugahara, Tokyo; Yoshibumi Noshi, Tsuruoka; Hiroyuki Naito, Tsuruoka; Seiichi Nakamura, Tsuruoka, all of Japan

[73] Assignee: Mizusawa Kagaku Kogyo Kabushiki Kaisha, Osaka, Japan

[21] Appl. No.: 632,009

[22] Filed: Nov. 14, 1975

[30] Foreign Application Priority Data

Nov. 15, 1974 Japan .................................. 49-131165

[51] Int. Cl.$^2$ ............................................. C08L 91/00
[52] U.S. Cl. .............................. 260/23 XA; 106/306;
106/308 Q; 252/400 A; 252/400 R; 260/2.5 D;
260/4 R; 260/17 R; 260/17.4 ST; 260/27 R;
260/28.5 D; 260/42.14; 260/42.44; 260/42.49;
260/45.7 R; 260/45.7 P; 260/45.75 R;
260/45.75 W; 260/45.75 T; 260/45.75 K
[58] Field of Search .......... 260/23 XA, 2.5 M, 2.5 D,
260/2.5 P, 33.4, 45.7 R, 45.75 V, 28.5 A;
252/317, 400 R

[56] References Cited

U.S. PATENT DOCUMENTS 2,179,973  11/1939  Alexander ..................... 260/45.75 R

OTHER PUBLICATIONS

Sarvetnick, "Polyvinyl Chloride", 1969, TP1180 v4852, p. 107.
Penn, "Polyvinyl Chloride", 1180 v48, pp. 53, 131, 133, 134, 135.

Primary Examiner—Melvyn I. Marquis
Attorney, Agent, or Firm—Sherman & Shalloway

[57] ABSTRACT

A stabilizer composition for chlorine-containing polymers having a much reduced tendency to blow at the molding step, which comprises (A) an inorganic stabilizer having a power volume of at least 0.5 cc/g, said stabilizer (A) consisting essentially of at least one member selected from the group consisting of silicates of metals of Groups II and IV of the Periodic Table and composites of silicate acid with oxides, hydroxides and carbonates of said metals, and (B) an organic additive having a boiling point or decomposition point higher than a chlorine-containing polymer-processing temperature, said organic additive (B) being incorporated into the stabilizer (A) at a weight ratio (A) : (B) of 1 : at least 0.1 so that the pore volume ratio defined by the following formula:

$$R = \frac{PVc}{PVa}$$

wherein PVc denotes the pore volume (cc/g) of the entire composition and PVa denotes the pore volume (cc/g) of said inorganic stabilizer (A), is not higher than 0.8.

32 Claims, No Drawings

STABILIZER COMPOSITION FOR CHLORINE-CONTAINING POLYMERS

This invention relates to a stabilizer composition for chlorine-containing polymers in which the blowing tendency at the molding step is highly controlled. More particularly, the invention relates to a stabilizer composition for chlorine-containing polymers having a much reduced tendency to blow at the molding step, which comprises (A) an inorganic stabilizer having a pore volume of at least 0.5 cc/g, said stabilizer (A) consisting essentially of at least one member selected from the group consisting of silicates of metals of Groups II and IV of the Periodic Table and composites of silicic acid with oxides, hydroxides and carbonates of said metals, and (B) an organic additive having a boiling point or decomposition point higher than chlorine-containing polymer processing temperature, said organic additive (B) being incorporated into the stabilizer (A) at a weight ratio (A) : (B) of 1 : at least 0.1 so that the pore volume ratio defined by the following formula:

$$R = \frac{PVc}{PVa}$$

where PVc denotes the pore volume (cc/g) of the entire composition and PVa denotes the pore volume (cc/g) of said inorganic stabilizer (A), is not higher than 0.8.

When a chlorine-containing polymer, for example, a vinyl chloride resin, is exposed to heat and light, dehydrochlorination is caused in the molecule chain and such undesired phenomena as decomposition and discoloration are brought about. There have heretofore been proposed various stabilizers and stabilizer compositions for stabilizing vinyl chloride resins against this thermal decomposition, and these stabilizers and stabilizer compositions are broadly used in the art.

It has been known from old that silicates such as lead silicates can be used as inorganic stabilizers for such purpose [see for example, Yoshinaga Abe, "Stabilizers for Plastics", page 93, published by Nikkan Kogyo Shinbun (1966)]. However, when these lead silicates are kneaded in vinyl chloride resins, they generate gases and they tend to cause blowing in final resin products. Therefore, they are not practically used commercially.

Silicates such as lead silicates are advantageous in that they have an ability to catch hydrogen chloride formed by the thermal decomposition of vinyl chloride resins and that since the basicity is lower than that observed when effective metal components are compounded in resins in the form of oxides or hydroxides, degradation of the resins by incorporation of the stabilizers can be reduced. However, these thermal stabilizing silicates have a fatal defect in that they have in the interior thereof micropores in which macropores and relatively large quantities of air and moisture are included and absorbed. The air and water are released as gases at the step of processing vinyl chloride resins. This defect is also observed similarly in silicates other than lead silicates.

For example, oxides and hydroxides of alkaline earth metals are excellent in reactivity with hydrogen chloride and hydrogen chloride-catching property, but because of a high basicity thereof, they show a conspicuous tendency to degrade chlorine-containing polymers. If such alkaline earth metal is compounded in the form of a silicate, the high basicity can be moderated, but gases are generated at the step of processing resins and it tends to cause blowing in final resin products.

We conducted extensive research with a view to developing chlorine-containing polymer stabilizers comprising metal silicates and made the following observations:

1. The thermal stabilizing effect of a silicate such as lead silicate or calcium silicate for chlorine-containing polymers is closely related to the pore volume of the silicate, and any silicates having a high thermal stabilizing effect also have a relatively large pore volume but these silicates also have a conspicuous tendency to cause blowing in chlorine-containing polymers at the processing step.
2. Wnen an organic additive (B) having a boiling point or decomposition point higher than the chlorine-containing polymer processing temperature is incorporated in such silicate having a relatively large pore volume so that the additive (B) is filled in pores of the silicate, the blowing tendency of the chlorine-containing polymers at the processing step can be prominently controlled without reduction of the excellent thermal stabilizing effect inherent of the silicate.

We have now completed the present invention based on these findings.

More specifically, in accordance with the present invention, the above-mentioned specific organic additive (B) for chlorine-containing polymers is incorporated into a silicate of a metal of Group II or IV of the Periodic Table so that the additive is impregnated and permeated uniformly in pores of the silicate, whereby generation of gases at a temperature for processing (kneading) a chlorine-containing polymer can be greatly controlled and there can be attained a novel effect of controlling prominently blowing in the resulting resin molded product. Accordingly, it is made possible to use industrially the silicate as a stabilizer for chlorine-containing polymers. It has not completely been elucidated why such effects can be attained in the present invention. However, in view of the fact that in a composition formed by compounding the above-mentioned specific organic additive for chlorine-containing polymers is incorporated into a silicate sufficiently intimately according to the present invention, the pore volume is much reduced as compared with that of the untreated silicate, namely the above-mentioned pore volume ratio (R) is generally not higher than 0.8, preferably not higher than 0.7, especially preferably not higher than 0.6, it is believed that non-condensable and condensable gases included and adsorbed in pores of silicate, such as air and water vapor, are substituted by the organic additive and hence, blowing at the processing step can be highly controlled.

By the term "an organic additive (B) having a boiling point or decomposition point higher than the chlorine-containing polymer processing temperature" used herein is meant an organic additive which does not substantially evaporate or does not generate substantially a decomposition gas at a temperature where the chlorine-containing polymer is processed, and it does not matter what form the additive (B) takes in the normal state. In general, chlorine-containing polymers are processed above 160° C. In other words, the additive (B) may take any of liquid, semi-solid, waxy and solid forms.

Pore volumes (PVc) and pore volume ratios (R) of compositions formed by incorporating various organic additives into calcium silicate according to the present invention are shown in Table 1-A.

Table 1-A

| Organic Additive | Compounding Ratio [(A):(B)] | Pore Volume (cc/g) | Pore Volume Ratio R |
|---|---|---|---|
| calcium silicate alone [CaSiO₃, Example 3 (h)] | 1 : 0 | 1.43 | — |
| epoxidized soybean oil | 1 : 0.3 | 0.60 | 0.42 |
| dioctyl phthalate | 1 : 0.3 | 0.65 | 0.45 |
| stearic acid | 1 : 0.3 | 0.75 | 0.52 |
| solid paraffin | 1 : 0.3 | 0.70 | 0.49 |

Values shown in Table 1-A indicate that even when a silicate having a relatively large pore volume is kneaded with a relatively small amount of an organic additive according to the present invention, the pore volume is prominently reduced in the resulting silicate composition. Further, from the results shown in Example 9 given hereinafter, it will readily be understood that when such silicate composition is incorporated in a chlorine-containing polymer, the blowing tendency is drastically controlled. Furthermore, in view of the fact that when the so treated silicate is calcined at 500° to 700° C. for 1 hour to burn the organic additive, the sintered silicate comes to have a pore volume of 1.30 approximating the pore volume of the untreated silicate (CaSiO₃), it is seen that in the treated silicate composition, neither the chemical structure nor the skeleton of the silicate is changed at all.

From the foregoing illustration, it will readily be understood that in the present invention, various organic additives for chlorine-containing polymers, such as exemplified hereinafter, can be used for prevention of blowing as far as they satisfy the above conditions.

Among a great number of organic additives applicable to the present invention, organic hydroxyl compounds in which the product of the number of hydroxyl groups and the number of carbon atoms is at least 6 are especially preferred, because the thermal stabilizing effect for chlorine-containing polymers can be further enhanced. Moreover, when these organic hydroxyl compounds are employed, pore volumes of the resulting silicate compositions can be reduced to much lower levels.

Table 1-B shows pore volumes of compositions formed by incorporating an organic hydroxyl compound into various silicates according to the present invention.

Table 1-B

| Silicate | Pore Volume (cc/g) of Silicate | Pore Volume (cc/g) of Organic Hydroxyl Compound-Incorporated Silicate | Pore Volume Ratio R |
|---|---|---|---|
| calcium silicate (Example 1) | 3.14 | 0.98 | 0.31 |
| lead silicate (Example 3) | 2.25 | 0.96 | 0.43 |
| zinc silicate (Example 3) | 1.23 | 0.51 | 0.41 |
| magnesium silicate (Example 3) | 1.48 | 0.53 | 0.36 |

From the values shown in Table 1-B, it will readily be understood that in the preferred embodiment of the present invention using a specific organic hydroxyl compound, the pore volume of the resulting silicate composition can be further reduced. Organic hydroxyl compounds in which the product of the number of hydroxyl groups and the number of carbon atoms is at least 6, which are used in the foregoing preferred embodiment of the present invention, have a higher compatibility or affinity than other organic compounds and they have such a peculiar property that they easily permeate into pores of the silicate and gases included and adsorbed in the pores are readily substituted by these organic hydroxyl compounds. Of course, in the foregoing preferred embodiment of the present invention, no particular disadvantage is brought about even if a physical or chemical linkage is formed between the silicate and the compounded organic compound. As is illustrated hereinafter, in order to improve the dispersibility or prevent blooming (plate-out) or build-up, it is often desired that a chemical linkage be formed between them.

In accordance with the above preferred embodiment of the present invention, many advantages other than mentioned above can be attained by the combined used of a silicate of a metal of Group II or IV of the Periodic Table and the above-mentioned organic hydroxyl compound. In short, the synergistic thermal stabilizing effect can be obtained over the case where a silicate of a metal of Group II or IV of the Periodic Table alone is employed or the case where the organic hydroxyl compound alone is employed. As is illustrated in comparative runs of Example 1 given hereinafter, when calcium silicate alone is used, the blowing tendency (medium blister of grade No. 2) is observed and the chlorine-catching ability is at a level of 90 minutes. Further, when the sample polymer is allowed to stand still at 180° C. for 60 minutes, conspicuous discoloration of grade No. 5 is caused. Moreover, in comparative samples of Example 5 formed by incorporating pentaerythritol or mannitol without using a silicate, the chlorine-catching ability is at such a low level as 29 minutes or 32 minutes, and when the samples are allowed to stand still at 180° C. for 30 minues, conspicuous discoloration of grade No. 5 is caused. In contrast, if both the components are used in combination according to the present invention, as is illustrated in Example 1 given hereinafter, the blowing tendency in molded resin products is completely controlled, and simultaneously, the chlorine-catching ability is improved to a level of 120 minutes and the standing time required for causing discoloration of grade No. 5 is prolonged to 130 minutes. As is seen from the foregoing experimental results, when the silicate and organic hydroxyl compound are used in combination, the thermal stabilizing effect exceeding the arithmetic mean of the effects attained by the two components independently. This is one of prominent advantages attained by the present invention.

Still further, when the silicate and organic hydroxyl compound are used in combination according to the present invention, discoloration can be greatly moderated in compounded chlorine-containing polymers. As pointed out hereinbefore, by using a stabilizing metal component such as an alkaline earth metal in the form of a silicate, there can be attained an advantage that the basicity can be reduced to a low level and the chemical degradation of the resin can be drastically controlled while retaining the reactivity with hydrogen chloride and the hydrogen chloride-catching property at high levels. However, in resin compositions formed by incorporating such silicate alone in a chlorine-containing polymer (comparative samples in Example 1), initial discoloration of grade No. 3 is caused, whereas in resin compositions of the present invention formed by incorporating both the components (samples of Example 1), the initial discoloration is effectively reduced to a level of grade No. 1. Thus, it will readily be understood that when the stabilizer composition of the present invention is employed, the chemical degradation preventing effect of the stabilizer per se can be highly enhanced by using the organic hydroxyl compound in combination.

Still in addition, according to the present invention, since an inorganic stabilizer consisting essentially of a silicate is employed, there is attained an advantage that the processability of chlorine-containing polymers can be highly improved. For example, known lead-free stabilizers in which the stabilizing metal component is used in the form of an organic compound such as a metal soap or dioctyl tin maleate are insufficient or not suitable for attaining the object of obtaining molded resin products excellent in the strength and impact resistance by performing the kneading operation effectively.

In view of characteristics of vinyl chloride resins, it can be said that the processability of these resins depends mainly on whether or not the resins can be subjected to a sufficient kneading treatment at processing temperatures, namely whether or not the resins can be homogeneously or uniformly plasticized (or gelatinized) at processing temperatures. In cases where resins cannot be subjected to the kneading treatment sufficiently and they are not homogeneously or uniformly plasticized or gelatinized, the mechanical properties of final molded resin products are not heightened to mechanical properties inherent of plastics, and no satisfactory results can be obtained as regards the impact resistance and the like. Processability of stabilizer-incorporated resin compositions can be determined by the plasticization efficiency test and kneading resistance test described below. The stabilizer composition of the present invention, even if it is used in combination with a known plasticizer or lubricating agent, provides a plasticization efficiency, defined by the following formula, of at least 14, preferably 15 to 35:

$$Ep = \tau_{max} \times Tp$$

wherein $\tau_{max}$ denotes a maximum torque (Kg.m) obtained when 3 to 6 parts by weight of a stabilizer sample is incorporated into 100 parts by weight of a vinyl chloride resin and the resulting composition is kneaded at 200° C. and 35 rpm by using Barbender Plasti-Coder Model P151, Tp denotes the plasticization time (min) required for attaining the maximum torque from the start of kneading, and Ep denotes the plasticization efficiency (Kg.m.min).

More specifically, this plasticization efficiency is determined based on the fact that within ranges of up to certain upper limits of the plasticization (gelation) time and maximum torque, a higher maximum torque or a longer plasticization time (time required for attaiment of the maximum torque) provides a higher efficiency of the operation of kneading a vinyl chloride resin and under these conditions the plasticization or gelatinization can be advanced sufficiently so that the mechanical properties of the molded resin product are elevated to high levels inherent of plastics.

Further, the stabilizer composition of the present invention has a kneading resistance, defined by the following formula, of from 11 to 250:

$$Rm = \tau_{max} \times 100/Tp$$

wherein $\tau_{max}$ and Tp are as defined above and Rm denotes the kneading resistance. This kneading resistance can be a scale for determining whether or not kneading can be accomplished effectively when a chlorine-containing polymer composition is kneaded at the molding step. Each of compositions including the above-mentioned known metal soap stabilizer has a kneading resistance value not exceeding 10. In the stabilizer composition of the present invention, the kneading resistance value can optionally be changed depending on the end use of the molded chlorine-containing polymer or the molding means by changing the mixing ratio of respective components within ranges described in the instant specification. For example, in case a rigid vinyl chloride resin composition is extrusion-molded, it is preferred that the kneading resistance value be adjusted within a range of from 11 to 40, and in case a soft vinyl chloride resin composition is calendered into a sheet, molded into a wire coating or injection-molded into a pipe joint or the like, it is preferred that the kneading resistance value be adjusted within a range of from 40 to 250.

Further, in accordance with the present invention, by using the above-mentioned specific silicate and specific organic additive in combination, it is made possible to improve conspicuously the dispersibility of the stabilizer into a chlorine-containing polymer over the single use of either of the two components, whereby such undesired phenomena as blooming (plate-out) and build-up of the stabilizer can be effectively prevented from occurring. For exaple, an organic hydroxyl compound such as pentaerythritol is defective in that it is generally poor in compatibility with a chlorine-containing polymer and it is hardly miscible with plasticizers or lubricating agents. From results of experiments made by us, it has been confirmed that when an organic hydroxyl compound or other organic additive is mixed with an alkaline earth metal salt stabilizer outside the scope of the present invention and the resulting mixture is heated at a temperature higher than the chlorine-containing polymer processing temperature, the organic hydroxyl compound or other organic additive separates from the stabilizer component and tends to precipitate in the bottom portion. Moreover, when such organic hydroxyl compound is kneaded with a chlorine-containing polymer and the kneaded composition is molded into a sheet, a pipe or the like, the organic hydroxyl compound tends to precipitate in the surface portion of the molded article to degrade the quality of the final product, and simultaneously, the processability of the resin is also degraded. In contrast, when an organic hydroxyl compound is incorporated into a silicate having the above-mentioned specific pore volume according to the present invention, some linkages or other are formed between the silicate and organic hydroxyl compound through pores of the silicate, and as illustrated in Example 1 given hereinafter, the dispersibility is highly improved and occurrence of plate-out can be effectively prevented. This fact can also be confirmed from the experimental fact that even when a mixture of a silicate having the specific pore volume and an organic hydroxyl compound with other additives such as a lubricating agent is heated at a temperature higher than the chlorine-containing polymer processing temperature, no separated layer of the hydroxyl compound is formed at all. Accordingly, it is believed that in the stabilizer composition of the present invention, even an organic hydroxyl compound poor in the compatibility with a chlorine-containing polymer is united with a finely divided silicate and it takes a dispersion behavior resembling that of an inorganic solid particle, with the result that occurrence of blooming or build-up can be effectively prevented. Moreover, silicates have a great tendency to adsorb water and cause secondary aggregation and dried aggregates are so tightly bonded that it is difficult to finely disperse them again. To our great surprise, it was found that if such silicates are combined with organic additives such as organic hydroxyl compounds according to the present invention, this aggregation tendency can be greatly reduced.

The present invention will now be described in detail.

Silicates

In the present invention, it is important to use a silicate of a metal of Group II or IV of the Periodic Table having a pore volume of at least 0.5 cc/g, preferably up to 5 cc/g, especially preferably 0.8 to 4.0 cc/g. By the term "pore volume" used herein is meant a total volume (cc) of pores contained in the unit weight (g) of a sample. Practically, the pore volume can be determined by measuring the integrated volume of pores having a size of from 75 to 75,000 A by using a porosimeter of the mercury pressing type. A silicate having a pore volume smaller than 0.5 cc/g is inferior in the hydrogen chloride catching property and hence, its effect of stabilizing a chlorine-containing polymer against heat is low. In the present invention, by selecting a silicate having a pore volume of at least 0.5 cc/g and treating this silicate with an organic hydroxyl compound, it is made possible to attain a high thermal stabilizing effect while controlling blooming of a chlorine-containing polymer at the kneading and molding steps. In view of reactivity with hydrogen chloride, it is preferred to use a silicate having a larger pore volume within a range of from 0.7 to 4.0 cc/g. Silicates having a pore volume of 5 cc/g or larger are generally difficultly available.

As the silicate, there can be used at least one member selected from alkaline earth metal silicates such as magnesium silicate, calcium silicate, barium silicate and strontium silicate, silicates of metals of Group IIb of the Periodic Table such as zinc silicate and silicates of metals of Group IV of the Periodic Table such as lead silicate. Among these silicates, magnesium silicate, calcium silicate and zinc silicate are preferably used as lead-free non-toxic stabilizers. In case a high thermal stability is desired, lead silicate is preferably employed.

Silicates of metals of Groups II and IV of the Periodic Table may be any of so called ortho-salts, basic salts and acidic salts (silicic acid-rich salts), but it is generally preferred that these silicates have a composition represented by the following formula:

$$MO \cdot nSiO_2$$

Wherein M stands for a metal of Group II or IV of the Periodic Table, and n is a number of 0.3 to 5, especially 0.5 to 4. In case the mole ratio (based on oxides) of the silicic acid component to the metal of Group II or IV of the Periodic Table is higher than 5, the obtained thermal stabilizing effect is sometimes reduced, and when this mole ratio is lower than 0.3, degradation or discoloration is sometimes observed in the compounded chlorine-containing polymer.

In order to attain uniform and homogeneous dispersibility and high thermal stabilizing effect, it is generally preferred that a silicate of a metal of Group II or IV of the Periodic Table to be used in the present invention be characterized by such a particle size distribution that particles having a size exceeding 40 $\mu$ occupy less than 40% of the total particles and particles having a size smaller than 20 $\mu$ occupy more than 50% of the total particles. In view of the chlorine catching ability, it is generally preferred that the surface area of the silicate to be used in the present invention be relatively large, more specifically, from 60 to 400 m²/g.

The above-mentioned silicate of a metal of Group II or IV of the Periodic Table may comprise as impurities other metal components, for example, alkali metals such as sodium and potassium, metals of Group III of the Periodic Table such as aluminum and metals of Group VIII of the Periodic Table such as iron, cobalt and nickel, in amounts not causing substantial changes in properties of the silicate, preferably up to 5% by weight (based on oxides), especially preferably up to 1% by weight.

Silicates that can be used preferably for attaining the objects of the present invention and have a relatively high pore volume are prepared by reacting an alkali silicate such as sodium silicate or sodium polysilicate in an aqueous medium with a water-soluble salt of a metal of Group II or IV of the Periodic Table, for example, water-soluble inorganic acid salts such as halides, nitrates, sulfates and bicarbonates or water-soluble organic acid salts such as acetates, formates and methanesulfonates, thus forming a silicate of the metal by the so called double decomposition method, washing the silicate with water if necessary, drying the silicate, calcining it if necessary and then finely pulverizing the resulting silicate.

In this double decomposition method, as the alkali silicate, there is preferably employed, for example, an aqueous solution of an alkali silicate represented by the following general formula:

$$M_2O \cdot nSiO_2$$

wherein M stands for an alkali metal and n is a number of 0.3 to 5, especially 0.5 to 3. As a specific example of such aqueous solution, there can be mentioned water glass. If desired, the above alkali silicate such as water glass may be contacted with a cation exchange resin of the H+ type or be mixed with a mineral acid, and the resulting partially dealkalized active alkali polysilicate aqueous solution may be used as the starting silicic acid component. The mole ratio of the bonded metal component and silicic acid component can be changed by changing the mole ratio of the alkali metal component in the alkali silicate or the mole ratio of the water-soluble salt of the metal of Group II or IV of the Periodic Table to the silicic acid component. The silicate obtained by this double decomposition method has such a porous structure that the pore volume is generally larger than 2.0 cc/g, and it is excellent in the hydrogen chloride catching property. However, such silicate releases relatively large quantities of gases which have been included and adsorbed in pores thereof at the chlorine-containing polymer processing temperature, and hence, it shows a conspicuous tendency to cause blowing in the resin at the molding step. According to the present invention, by combining a specific organic hydroxyl compound with such silicate, a desired combination of a high thermal stabilizing effect and a high blowing resistance can be obtained.

Another type of metal silicates preferably used in the present invention are prepared by the so called hydrothermal synthesis method. According to this synthesis method, a starting silicic acid component such as finely divided silicic acid and an oxide or hydroxide of a metal of Group II or IV of the Periodic Table are charged together with an aqueous medium in a pressure vessel such as an autoclave, and a silicate is formed by actions of pressure, heat and water by maintaining the reaction mixture at a temperature of 100° to 200° C. and a pressure of 2 to 20 atmospheres (gauge). Also the silicate synthesized according to this method has a relatively large pore volume and it is preferably employed for attaining the objects of the present invention.

Still another type of silicates of a metal of Group II or IV of the Periodic Table that can be used in the present invention are prepared by uniformly mixing a hydrosol, hydrogel or xerogel of silicic acid or a fine powder of crystalline anhydrous silicic acid with an oxide, hydroxide or carbonate of an alkaline earth metal preferably in the presence of water, calcining the resulting mixture at 60° to 1000° C., preferably 120° to 800° C., and, if desired, pulverizing the sintered product by the dry or wet pulverization method.

Still another type of metal silicates that can be preferably used in the present invention are prepared by using as the starting silicic acid component a silicic acid-rich natural mineral or clay, a purified product thereof or a mineral silicate or clay acid-treated or alkali-treated under preferred conditions, mixing such silicic acid component with an oxide, hydroxide or carbonate of an alkaline earth metal at a suitable mixing ratio, reacting them according to a known dry or wet pulverizing mixing method, if necessary under heating, calcining the reaction product, if necessary, at 60° to 1000° C., and pulverizing and sieving the product.

As the alkaline earth metal oxide or hydroxide that can be used in this synthesis method, there can be mentioned, for example, calcium oxide, calcium hydroxide, magnesium hydroxide, barium hydroxide and strontium hydroxide. In view of the availability, the manufacturing cost and the thermal stabilizing effect, use of calcium oxide and calcium hydroxide is most preferred. Further, zinc oxide, zinc hydroxide, lead oxides such as litharge, red lead and lead suboxide, and lead hydroxides may also be used in this synthesis method.

As the carbonate of an alkaline earth metal, for example, calcium, magnesium, barium or strontium or zinc or lead that can be used, there can be mentioned carbonates represented by the following general formula:

wherein M stands for a metal of Group II or IV of the Periodic Table and $m$ is zero or a number greater than zero. As examples of such carbonates, there can be mentioned basic calcium carbonate, calcium carbonate, basic magnesium carbonate, magnesium carbonate, basic zinc carbonate, basic lead carbonate, and bicarbonates such as calcium bicarbonate and magnesium bicarbonate.

As the starting silicic acid component, there can be employed not only synthetic products such as colloidal silica, activated silica powder and silica gel powder, but also montmorillonite clays such as acid clay, other clay minerals such as kaolin, and diatomaceous earth and the like, from which basic metal components have been removed by an acid treatment. Since a silicic acid component prepared by acid-treating a clay mineral such as exemplified above is capable of reacting easily with a polyvalent metal component and providing a finely divided silicate having a pore volume of at least 0.5 cc/g with ease, it can be used effectively in the present invention. Still further, crystalline anhydrous silicic acid such as sliceous sand can also be employed for the production of the silicate in the present invention, as far as it is so finely divided that the particle size thereof is smaller than 20 $\mu$.

The silicate of a metal of Group II or IV of the Periodic Table to be used in the present invention may be a gelatinous or amorphous product which does not show an X-ray diffraction pattern inherent of the metal silicate or may be a product showing such X-ray diffraction pattern definitely. It is believed that the intended objects of the present invention can be attained as far as the metal silicate used has a pore volume within a range specified by the present invention and it does not matter at all whether the metal silicate is amorphous or crystalline. However, it must be noted that any of silicates that can be used in the present invention and silicic acid-metal component composites described below shows an X-ray diffraction pattern inherent of the metal silicate when heated at temperatures higher than 400° C.

In the present invention, products in which the silicic acid component and the component of a metal of Group II or IV of the Periodic Table are not so strongly bonded as to form a salt but they are weakly bonded to such an extent that the pH is reduced to a level much lower than the pH observed when the metal component is present in a non-bonded state such as in the form of an oxide or hydroxide may be used as well as the above-mentioned silicates, as far as their pore volumes are at least 0.5 cc/g. In the instant specification, these products are called "composites". These composites can be prepared, for example, by intimately mixing the above-mentioned silicic acid component with an oxide, hydroxide or carbonate of a metal of Group II or IV of the Periodic Table in the presence of water or in the absence of water, drying the mixture at a relatively low temperature not exceeding 400° C. and, if desired, pulverizing the dried mixture. For example, a 1 : 1 mixture of $Ca(OH)_2$ and silicic acid has a pH of 10, but a product formed by mixing both the components in the presence of water and drying the mixture at 170° C. for 3 hours has a pH of 8, though it does not show at all an X-ray diffraction pattern inherent of calcium silicate. In short, the pH of the so formed composite is much lower than the pH of a mere mixture. This fact indicates that a certain weak linkage is formed between the calcium component and the silicic acid component.

Still another group of silicates of metals of Groups II and IV of the Periodic Table, especially alkaline earth metal silicates, are prepared by purifying naturally occurring alkaline earth metal silicates and, if desired, pulverizing the purified products to adjust the pore volume to at least 0.5 cc/g. A suitable example of the metal silicate of this type is basic magnesium silicate (talc) marketed under the tradename of "Mistron Vapor". Of course, in the present invention, products formed by using natural silicates such as talc, kaolin, acid clay and diatomaceous earth and reacting them with additional amounts of alkaline earth metal components can be used as inorganic stabilizers. Still another group of silicates are those obtained in ceramic industries or metal smelting industries. For example, blast furnace slag is composed mainly of calcium silicate and a product obtained by finely pulverizing this slag so that the pore volume is within the range specified in the present invention can also be used for attaining the objects of the present invention.

In the stabilizer composition of the present invention, when an alkaline earth metal silicate is used as the inorganic stabilizer, in order to further reduce the initial discoloration in the resulting compounded chlorine-containing polymer, it is preferred that an oxide, hydroxide, inorganic acid salt or organic acid salt of zinc be used in combination in an amount of 0.03 to 1 part by weight, especially 0.05 to 0.5 part by weight, per part by weight of the alkaline earth metal silicate.

Either so called finely crystalline zinc oxide or amorphous zinc oxide can be used as the zinc oxide, and any of zinc hydroxides of α-, β-, γ- and δ-crystal forms and gelatinous zinc hydroxides can be used as the zinc hydroxide. As the inorganic acid salt of zinc, there can be employed, for example, zinc carbonate, zinc silicate, zinc phosphite, zinc sulfate, zinc phosphate and zinc borate. As the organic acid salt of zinc, there can be employed, for example, fatty acid salts of zinc such as zinc stearate, zinc laurate, zinc palmitate and basic zinc stearate, and zinc naphthenate, zinc resinate, zinc montanate, zinc benzoate, zinc salicylate and a zinc salt of oxidized polyethylene wax.

Organic Additives for Chlorine-Containing Polymers

In the present invention, various organic additives having a boiling point or decomposition point higher than the chlorine-containing polymer processing temperature, i.e. 160° C. are used in combination with metal silicates such as mentioned above. These organic additives include various organic stabilizers, lubricating agents, plasticizers and thermoplastic resins for incorporation into chlorine-containing polymers.

These organic additives will now be described by referring to specific examples thereof.

I. Organic Stabilizers

1. Organic Hydroxyl Compounds:

In the preferred embodiment of the present invention, as pointed out hereinbefore, an organic hydroxyl compound in which the product of the number of hydroxyl groups and the number of carbon atoms is at least 6, preferably at least 8, is used in combination with the above-mentioned specific silicate, whereby a desired combination of a high resistance to blooming and a high thermal stability can be attained. Organic hydroxyl compounds in which the product of the number of hydroxyl groups and the number of carbon atoms (hereinafter referred to an "Pch value") is smaller than 6, for example, monohydric alcohols such as methanol and ethanol and polyhydric alcohols such as ethylene glycol tend to evaporate at the chlorine-containing polymer processing temperature, and it is difficult to control sufficiently blowing. In contrast, when an organic hydroxyl compound having a Pch value of at least 6, preferably at least 8, is used according to the preferred embodiment of the present invention, the blowing resistance of the silicate is highly improved and the thermal stabilizing effect to chlorine-containing polymers is synergistically improved. Further, undesired initial discoloration caused when the silicate is used can be greatly reduced.

The reason why preferred organic hydroxyl compounds are defined by the Pch value is as follows:

Monohydric alcohols do not show a sufficient blowing-preventing effect unless they contain a relatively great number of carbon atoms, but in the case of polyhydric alcohols, a blowing-preventing effect can be obtained even when the number of carbon atoms is relatively small. Thus, the blowing-preventing activity is closely concerned with both the number of hydroxyl groups and the number of carbon atoms. The criticality of this Pch value for attaining a sufficient blowing-preventing effect will readily be understood from Table 5 given in Example 4 shown hereinafter.

Suitable examples of organic hydroxyl compounds having a Pch value of at least 6 are as follows:

1. Polyhydric alcohols:

1,3-Butane diol, propylene glycol, dipropylene glycol, triethylene glycol, glycerin, diglycerin, glycerin fatty acid monoester, 1,3-butane diol montanic acid monoester, monopentaerythritol, polypentaerythritols such as dipentaerythritol, mannitol, sorbitol, glucose, fructose, trimethylol propane, polyethylene glycol monofatty acid ester, polyethylene glycol having a molecular weight of, for example, 200 to 9,500, polypropylene glycol having a molecular weight of, for example, at least 1,000, polyoxyethylene-polyoxypropylene block polymers having a molecular weight of, for example, 1,900 to 9,000, and adducts of ethylene oxide or propylene oxide to a polyhydric alcohol such as glycerin, pentaerythritol, sorbitol or the like.

2. Higher aliphatic alcohols:

Hydroxystearic acid, linear aliphatic monohydric alcohols formed by reducing an animal or vegetable oil or fat or a fatty acid ester thereof or subjecting natural wax to decomposition distillation and having at least 6 carbon atoms, preferably at least 8 carbon atoms, and tridecyl alcohol.

3. Phenols:

Alkyl gallates such as propyl, octyl and dodecyl gallates, guaiac fat, p-methoxyphenol, alkylated phenol, styrenated phenol, styrenated cresol, butylstyrenated cresol, phenylphenol, methyl salicylate, phenyl salicylate, p-tert-butylphenyl salicylate, methyl p-hydroxybenzoate, propyl p-hydroxybenzoate, hydroquinone monobenzyl ether, butylated hydroxytoluene, 2,5-di-tert-amyl hydroquinone, 4-hydroxymethyl-2,6-di-tert-butylphenol, 2,6-di-tert-p-phenylphenol, 4,6-dinonyl-o-cresol, butylated hydroxyanisole, 2,2'-bis(4-hydroxy)-propane (bisphenol A), polybutylated 4,4'-isopropylidene diphenol (mixture), 2,2'-methylene-bis(4-methyl-6-tert-butylphenol), 2,2'-methylene-bis(4-ethyl-6-tert-butylphenol), 2,2'-methylene-bis(4-metyl-6-tert-octylphenol), 2,2'-methylene-bis(4-methyl-6-nonylphenol), 2,2-methylene-bis[6-(1-methylcyclohexyl)-p-cresol], a mixture of 2,2'-methylene-bis(4-methyl-6-nonylphenol) and 2,6-bis(2-hydroxy-3-nonyl-5-methyl-benzyl)-p-cresol, 4,4'-butylidene-bis(6-tert-butyl-m-cresol), tris(2-methyl-4'-hydroxy-5-tert-butylphenyl)butane, tetrakis[methylene-3-(3',5'-di-tert-butyl-4'-hydroxyphenyl)propionate]methane, 1,3,5-trimethyl-2,4,6-tris(3,5-di-tert-butyl-4-hydroxybenzyl)benzene, n-octadecyl-β-(4'-hydroxy-3'-3',5'-di-tert-butylphenyl)-propionate, N-n-alkyl-N'-(carboxymethyl)-N,N'-trimethylenediglycine, 2-n-octyl-thio-4,6-di-(4'-hydroxy-3',5'-di-tert-butyl) phenoxy-1,3,5-triazine, thio-bis[methylbutylphenol], 4,4'-thio-bis[6-tert-butyl-m-cresol], 2,4,5-trihydroxybutyrophenone, 2-hydroxy-4-methoxybenzophenone, 2-hydroxy-4-n-octoxybenzophenone, 2,2'-dihydroxy-4-methoxybenzophenone, 2-hydroxy-4-methoxy-2'-carboxybenzophenone, 2-(2'-hydroxy-5'-methylphenyl)-benzotriazole, 2-(2'-hydroxy-3'-tert-butyl-5'-methylphenyl)-5-chlorobenzotriazole and 2-(2'-hydroxy-3',5'-di-tert-butylphenyl)-5-chlorobenzotriazole.

These polyhydric alcohols, higher aliphatic alcohols and phenols may be used or in the form of mixtures of two or more of them. For example, a polyhydric alcohol and a phenol may be used at a mixing wight ratio of from 1 : 0.1 to 1 : 10, and organic hydroxyl compound which is a solid crystal in the normal state and another organic hydroxyl compound that is liquid or semi-solid in the normal state may be used at a mixing weight ratio of from 1 : 0.1 to 1 : 10.

In addition to the foregoing organic hydroxyl compounds, there may be employed one or more of other organic stabilizer compounds for preventing blowing of the silicate component. As such organic stabilizers, there can be mentioned non-metallic stabilizers such as nitrogen compound type stabilizers, sulfur compound type stabilizers and phosphorus compound type stabilizers, and organic tin compound type stabilizers and metal soap stabilizers. Suitable examples of these stabilizers are as follows:

2. Nitrogen Compounds:

Ammonium higher fatty acid salts, ammonium citrate, urea, N,N-diphenylthiourea, hexamethylene tetraamine, esters of β-aminocrotonic acid with such alcohols as 1,3-butane diol, 1,4-butane diol, 1,2-dipropylene glycol, thiodiethylene glycol and linear saturated alcohols having at least 12 carbon atoms, N,N'-diphenylethylene-diamine, N,N'-disalicylal-propylene-diamine and N,N'-di-o-touyl-ethylene-diamine.

3. Phosphorus Compounds:

Tris(nonylphenyl) phosphite, 2-tert-butyl-α-(3-tert-butyl-4-hydroxyphenyl)-p-cumenyl-bis(p-nonylphenyl) phosphite, hydrogenated 4,4'-isopropylidene-diphenol phosphite and tris(nonylphenyl) phosphite-formaldehyde condensate.

4. Sulfur Compounds:

Thiodipropionic acid, diethyl thiodipropionate, dilauryl thiodipropionate, dimyristyl thiodipropionate, distearyl thiodipropionate, laurylstearyl thiodipropionate and stearyl-(3,5-dimethyl-4-hydroxybenzyl) thioglycolate phenothiazine.

5. Organotin Compounds:

Sn (II) stearate, Sn (II) oleate, butyl thiostannate, di-n-octyl tin laurate, di-n-octyl tin maleate polymer, di-n-octyl tin maleate, di-n-octyl tin bis(isooctylthio-glycolate), di-n-octyl tin 1,4-butanediolthioglycolate, di-n-octyl tin thiobenzoate and diethyl hexyl thioglycolate.

6. Metal Soaps:

Salts of higher fatty acids such as palmitic acid, stearic acid, oleic acid, linoleic acid, linolic acid and lauric acid with alkali metals such as potassium, alkaline earth metals such as calcium and magnesium, zinc, aluminum and lead.

II. Plasticizers

1. Phthalic Acid Esters:

Diethyl phthalate, di-n-butyl phthalate, di-iso-butyl phthalate, dihexyl phthalate, di-iso-heptyl phthalate, dioctyl phthalate (DOP) (inclusive of n-octyl, 2-ethyl-hexyl and isooctyl(oxo) esters), di-iso-heptyl-iso-nonyl phthalate, di-n-octyl-n-decyl phthalate, didecyl phthalate (inclusive of n-decyl and iso-decyl esters), butylbenzyl phthalate, diphenyl phthalate, dicyclohexyl phthalate, dimethylcyclohexyl phthalate, dimethoxyethyl phthalate, dibutoxyethyl phthalate, ethylphthalyl ethyl glycolate and butylphthalyl butyl glycolate.

2. Aliphatic Dibasic Acid Esters:

Di-iso-butyl adipate, octyl adipate (inclusive of 2-ethylhexyl and n-octyl esters), didecyl adipate (inclusive of iso-decyl and n-decyl esters), di-(n-octyl-n-decyl) adipate, dibenzyl adipate, dibutyl adipate, dibutyl sebacate (n-butyl ester), dioctyl sebacate (inclusive of 2-ethylhexyl and n-octyl esters), n-hexyl azelate and dioctyl azelate (2-ethylhexyl ester).

3. Phosphoric Acid Esters:

Diphenyl-2-ethylhexyl phosphate.

4. Hydroxyl-Polycarboxylic Acid Esters:

Diethyl tartarate, triethyl acetylcitrate, tributyl acetylcitrate, 2-ethylhexyl acetylcitrate, mono-isopropyl citrate, tributyl citrate, monostearyl citrate, disteryl citrate and tristeryl citrate.

5. Fatty Acid Esters:

Methyl acetylricinoleate, ethyl palmitate, ethyl stearate, n-butyl stearate, amyl stearate, cyclohexyl stearate, butyl oleate and hydrogenated methyl resinate.

6. Polyhydric Alcohol Esters:

Glycerin triacetate, glycerin tripropionate, glycerin tributyrate, glycerin triheptanoate, triethylene glycol dicaprylate, triethylene glycol dicaprate and pentane diol di-isobutylate.

7. Epoxy Type Plasticizers:

Epoxidized soybean oil, epoxidized castor oil, epoxidized linseed oil, epoxidized safflower oil, butyl epoxidized linseed oil fatty acid ester, octyl epoxystearate (inclusive of iso-octyl and 2-ethylhexyl esters), and 3-(2-xenoxy)-1,2-epoxypropane.

8. Polyester Type Plasticizers:

Poly(diethylene glycol terpene-maleic anhydride adduct)ester, poly(propylene glycol adipate), poly(1,3-butane diol adipate), poly(propylene glycol sebacate), poly(1,3-butane diol sebacate), poly(propylene glycol phthalate), poly(1,3-butane diol phthalate), poly(ethylene glycol adipate), poly(1,6-hexane diol adipate) and acetylated poly(butane diol adipate) (inclusive of 1,3- and 1,4-butane diol esters).

9. Other Plasticizers:

Phenol alkylsulfonates ($C_{12} - C_{20}$), cresol alkylsulfonates ($C_{12} - C_{20}$), hydrogenated polybutene, p-tert-butylphenyl salicylate and chlorinated paraffin.

III. Lubricating Agents:

1. Aliphatic Hydrocarbon Type Lubricating Agents:

Liquid paraffin, industrial white mineral oil, synthetic paraffin, petroleum wax, petrolatum and odorless light hydrocarbons.

2. Silicones:

Organopolysiloxanes.

3. Fatty Acids:

Higher fatty acids such as fatty acids derived from animal and vegetable oils and fats and hydrogenated products thereof, which have 8 to 22 carbon atoms.

4. Amides and Amines:

Higher fatty acid amides, oleylpalmitamide, 2-stearomidoethyl stearate, ethylene-bisfatty acid amides, N,N'-oleoylstearylethylene diamine, N,N'-bis(2-hydroxyethyl)alkyl ($C_{12} - C_{18}$) amides, N,N'-bis(hydroxyethyl)lauroamide, oleic acid reacted with N-alkyl ($C_{16} - C_{18}$) trimethylene diamine, fatty acid diethanol amines and di-(hydroxydiethyl)-diethylene-triamine monostearate ester of distearic acid.

5. Monohydric Alcohol and Polyhydric Alcohol Esters of Fatty Acids:

n-Butyl stearate, hydrogenated methyl resinate, di-n-butyl sebacate, dioctyl sebacate (inclusive of 2-ethylhexyl and n-octyl esters), glycerin fatty acid esters, pentaeryjthritol tetrastearate, polyethylene glycol fatty acid diesters, polyethylene glycol distearate, polyethylene glycol dilaurate, polyethylene glycol dioleate, polyethylene glycol coconut fatty acid diesters, polyethylene glycol tall oil fatty acid diester, ethane diol montanic acid diester, diethylene glycol distearate, and propylene glycol fatty acid diesters.

6. Triglycerides and Waxes:

Hydrogenated edible oils and fats, cotton seed oil and other edible oils, linseed oil, palm oil, glycerin 12-hydroxystearate, hydrogenated fish oils, beef tallow, spermaceti wax, montan wax, carnarba wax, beeswax, haze wax, monohydric aliphatic alcoholaliphatic saturated acid esters such as hardened sperm oil lauryl stearate and stearyl stearate, and lanolin.

7. Other Lubricating Agents:

Propylene glycol alginate and dialkyl ketones.

IV. Thermoplastic Resins

1. Vinyl Chloride Polymers:

1-(i) Vinyl Chloride Homopolymers:

Vinyl chlorides homopolymers.

1-(ii) Vinyl Chloride Copolymers:

Copolymers of vinyl chloride with at least one comonomer selected from vinylidene chloride, vinyl esters of aliphatic carboxylic acids, esters of aliphatic carboxylic acids with aliphatic monohydric alcohols, acrylic acid esters, methacrylic acid esters, maleic acid esters, fumaric acid esters, itaconic acid esters, crotonic acid esters, phthalic acid esters, vinyl ethers of saturated aliphatic monohydric alcohols, butadiene, acrylonitrile, methacrylonitrile, acrylamide, methacrylamide, styrene, styrene derivatives having the benzene ring or vinyl group substituted with a halogen atom or allyl group, β-methyl styrene, maleic acid, maleic anhydride, fumaric acid, itaconic acid, acrylic acid, methacrylic acid, crotonic acid, vinylsulfonic acid, vinyl pyrrolidone, aliphatic monolefins, isoprene, chloroprene, divinylbenzene, methylol acrylamide, methylol methacrylamide, 5-norbornene-2,3-dicarboxylic acid, n-butyl 5-norbornene-2,3-dicarboxylate, allyl alcohol, ethylene and propylene.

1-(iii) Modified Vinyl Chloride Polymers:

Chlorinated vinyl chloride polymers, hydroxylated vinyl chloride-vinyl acetate copolymers, hydroxyl-modified vinyl chloride-vinyl acetate copolymers and vinyl chloride-vinyl alcohol copolymers.

2. Styrene Type Polymers:

Styrene homopolymers, copolymers of styrene with at least one comonomer selected from compounds exemplified below and mixtures of these polymers:

β-Methylstryene, vinyl toluene, divinylbenzene, acrylonitrile, butadiene, ethylene oxide, fumaric acid esters, maleic acid esters, acrylic acid esters, methacrylic acid esters, acrylic acid, methacrylic acid, maleic anhydride, potassium methacrylate, methacrylamide methylol ether, vinyl methyl ether, isobutylene, vinylidene chloride and 1,3-butylene glycol dimethyl methacrylate.

3. Chlorinated Polyolefins:

Chlorinated polyethylene and other chlorinated polyolefins.

4. Other Polymers:

Acrylonitrile-butadiene copolymers, polybutadiene, butyl rubber, hydrogenated polybutene, polybutene, chlorinated rubber, hydrochloric acid rubber, natural rubber, polyisobutylene, chlorinated isobutylene-isoprene copolymers, isobutylene-isoprene copolymers, ethylenevinyl ester copolymers, ethylene-acrylic acid copolymers, ethylene-propylene copolymers, chloroprene rubber, polyurethane, aliphatic polyesters, polyvinylpyrrolidone, butyl acrylate-vinylpyrrolidone copolymers, poly(acrylic acid ester), poly(methacrylic acid ester), acrylic acid ester-methacrylic acid ester copolymers, ethyl cellulose, carboxymethyl cellulose, cellulose acetate butyrate, cellulose acetate, cellulose acetate propionate, hydroxyethyl cellulose, ethylhydroxyethyl cellulose, hydroxypropylmethyl cellulose, methyl cellulose, nitrocellulose, gelatin, starch, dextrin, tragacanth gum, polyethylene adipate, polyvinyl ethyl ether, condensates of sorbitol and/or ethylene oxide, copal, damar, elemi, gilsonite, sandarac, glycol esters of damar, copal, elemi and sandarac, shellac, utah coal resin, thermoplastic epoxy resins, coumaroneindene resins, petroleum hydrocarbon resins, terpene resins, polyvinyl formal, polyvinyl butyral, polyethylene, polypropylene, maleic modified polyethylene, polyvinyl alcohol, polyvinyl stearate, acrylamides of ethyl acrylate, styrene or methacrylic acid reacted with formaldehyde and butanol, acrylic acid polymers, methacrylic acid polymers, 4-fluorinated ethylene resins, silicone resins, acrylic and methacrylic copolymers including butyl acrylate, ethyl acrylate, methyl methacrylate, ethyl methacrylate, n-propyl methacrylate, 2-ethylhexyl acrylate, acrylic acid, glycidyl methacrylate, n-hexyl methacrylate, methacrylic acid, acrylonitrile, butadiene, fumaric acid, itaconic acid, styrene, vinyl acetate and vinylidene chloride, dimethylpolysiloxane-m-phenylethylmethylpolysiloxane copolymers, petroleum alicyclic hydrocarbon resins, hydrogenated petroleum alicyclic hydrocarbon resins, polyester resins formed by reaction of ethylene glycol with acid groups of montan wax, vinyl acetate homopolymers, copolymers of vinyl acetate with at least one comonomer selected from acrylamide, acrylic acid, acrylomitrile, bicyclo(2,2,1)-hepto-2-ene-6 methacrylate, butyl acrylate, crotonic acid, decyl acrylate, difumaryl fumarate, diallyl maleate, diallyl phthalate, dibutyl fumarate, dibutyl itaconate, dibutyl maleate, di-2-ethylhexyl maleate, divinylbenzene, ethyl acrylate, 2-ethylhexyl acrylate, fumaric acid, itaconic acid, methacrylic acid, methyl acrylate, methyl methacrylate, mono-2-ethylhexyl maleate, monoethyl maleate, styrene, vinyl butyral, vinyl crotonate, vinyl hexenoate, vinylidene chloride, vinyl pelargonate, vinyl propionate, vinylpyrrolidone, vinyl stearate and vinyl sulfonate, vinylidene homopolymers, copolymers of vinylidene chloride with at least one comonomer selected from acrylamide, acrylic acid, acrylonitrile, butyl acrylate, butyl methacrylate, ethyl acrylate, ethyl methacrylate, fumaric acid, itaconic acid, methacrylic acid, methyl acrylate, methyl methacrylate, octadecyl methacrylate, propyl methacrylate, propyl acrylate and vinyl sulfonate, and oxidized polyethylene.

These organic additives as pore-filling agents may be used singly or in the form of mixtures of two or more of them. For example, only one kind of an additive selected from organic stabilizers, plasticizers, lubricating agents or thermoplastic polymers exemplified above may be used, or one kind each of additives may be selected from the foregoing four groups of organic additives and they may be used in optional combination as the dispersion medium.

Among the foregoing resins that can be used as organic additives for chlorine-containing polymers, so called epoxy resins are especially preferred. By epoxy resins are meant polymeric compounds having at least 2 epoxy groups in the molecule, and they are generally prepared by condensing epichlorohydrin with a polyhydric phenol or alcohol. These resins have hydroxyl groups or come to have hydroxyl groups when they are ring-opened by reacting silanol-hydroxyl groups of the silicate. Accordingly, these resins are excellent in reducing the pore volume of the silicate to a low level as well as the above-mentioned organic hydroxyl compounds. Further, these epoxy resins have much reduced evaporation or blooming tendency, and they are very suitable for compounding into chlorine-containing polymers in combination with the above silicate.

Preferred examples of such epoxy resins are those represented by the following structural formula:

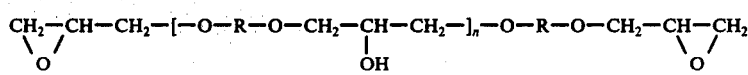

wherein $n$ is a number of 0 to 12 and R is a residue of a dihydric alcohol or phenol. As preferred examples of the dihydric alcohol HO-R-OH, there can be mentioned diols such as polyethylene glycol and polypropylene glycol, and as the dihydric phenol, there can be mentioned 2,2-bis(4'-hydroxyphenyl)propane (bisphenol A) and a resol type condensate of phenol and formaldehyde.

In addition, glycerin triglycidyl ether, diglycidyl phthalate and vinyl cyclohexene oxide can be used effectively as the thermoplastic epoxy resin.

COMPOUNDING

According to the present invention, a silicate of a metal of Group II or IV of the Periodic Table having the above-mentioned specific pore volume [component (A)] and an organic additive as exemplified above [component (B)] are mixed at a weight ratio (A) : (B) of 1 : at least 0.1, preferably from 1 : 0.3 to 1 : 5. When the amount compounded of the organic additive (B) as the pore-filling agent is smaller than the abovementioned range, as is seen from sample 5-1 of Example 5 given hereinafter, it is difficult to reduce the blooming tendency in the chlorine-containing polymer at the kneading and processing step below a level of medium blister, grade No. 4. In contrast, when the amount of the organic additive as the pore-filling agent exceeds the above range, a satisfactory blowingpreventing effect can be obtained but if the organic additive is an organic hydroxyl compound, the excessive additive separates from the silicate and there are often brought about problems about the dispersion of the additive, for example, problems of blooming and build-up.

Compounding of the silicate and organic additive may be accomplished by optional means but it is necessary that compounding should be performed so that both the components are homogeneously blended and the pore volume ratio (R) is within the range specified in the present invention. For example, the silicate and organic additive are homogeneously blended according to the so called dry blending method by using a high speed rotation such as a Henschel mixer or a supermixer. In case the organic additive is liquid or semisolid, even if an ordinary mixer such as a ribbon blender or a Hauta mixer instead of the above-mentioned high speed rotation mixer, the organic additive can be effectively impregnated into pores of the silicate and gases included therein can be effectively expelled to reduce drastically the pore volume in the silicate. Even when the organic additive is a solid substance having a relatively high melting point such as pentaerythritol, by imparting violent shearing and friction to the mixture with a high speed rotation mixer such as mentioned above, intimate compounding of the silicate and organic additive can be accomplished, and as illustrated in Example 1 given hereinafter, the pore volume of the silicate can be conspicuously reduced.

Instead of the above dry-blending method, there may be adopted a wet-blending method using methanol, ether, LPG, butane gas or other low-boiling-point solvent as the mixing medium. Also in this case, both the components can be compounded homogeneously and intimately.

Still further, both the silicate and organic additive can be kneaded homogeneously by passing them through a roll, a Banbury mixer, a pelletizer or the like at a temperature corresponding to the melting point or softening point of the organic hydroxyl compound.

In short, any of mixing and blending methods can optionally be used in the present invention, as far as both the components are mixed homogeneously and intimately and the pore volume in the silicate is conspicuously reduced, and the mixing and blending means is not particularly critical in the present invention. In order to ensure impregnation of the organic additive into the pores of the silicate, it is possible to use a suitable surface active agent, solvent or plasticizer for reducing the surface tension or viscousness of the organic additive, elevate the temperature or reduce the pressure or evacuate the mixing or blending system. Other optional auxiliary means can also be adopted at the compounding step for attaining the above purpose. Furthermore, in order to distribute the organic additive uniformly into the pores of the silicate, it is possible to age the composition of the silicate and organic additive at a temperature higher than the softening point or melting point of the organic additive or to age the composition at the chlorine-containing polymer processing temperature or a higher temperature.

In the present invention, when an organic hydroxyl compound having a Pch value of at least 6 is employed as the organic additive, there is attained an advantage that the operation of filling the organic hydroxyl compound into pores of the silicate can be performed very easily. Further, even when an organic additive other than such organic hydroxyl compound, the pore volume of the silicate can be reduced very easily by adopting a compounding operation such as mentioned above.

In case the organic additive used for clogging pores of the silicate is a thermoplastic resin, it is preferred that the resin be combined with an organic solvent or plasticizer and it be incorporated into the silicate in the form of a plastisol, organosol or solution. As another method for incorporating a thermoplastic resin into pores of the silicate, there can be mentioned a method in which monomers constituting the thermoplastic resin, such as exemplified above, are first incorporated into the silicate and they are then polymerized in situ according to known polymerization means. In this case, as polymerization means, there can be adopted, for example, ionizing irradiation polymerization, photo-polymerization and catalytic polymerization using a peroxide or azo compound.

Dispersion Medium

In the stabilizer composition of the present invention, since the silicate is kept in the state where the blowing tendency is much reduced, it can be directly applied to resin processing makers as a stabilizer. In general, however, it is preferred that a suitable additional amount of at least one member selected from plasticizers, lubricating agents and thermoplastic resins that are liquid or plastic at a temperature lower than the chlorine-containing polymer processing temperature be incorporated into the stabilizer composition of the present invention as a dispersion medium and additive for a chlorine-containing polymer. Preferably, the dispersion medium (C) is incorporated in such an amount that the mixing weight ratio of the dispersion medium (C) to the inorganic stabilizer (A) and the organic additive (B), namely the [(A) + (B)] : (C) weight ratio, is from 1 : 0.03 to 1 : 5, especially from 1 : 0.1 to 1 : 3, and that the mixing weight ratio of the dispersion medium (C) to the organic additive (B) filled in pores of the silicate, namely the (B) : (C) weight ratio, is from 1 : 0.06 to 1 : 10, especially from 1 : 0.2 to 1 : 6, whereby respective components of the stabilizer composition of the present invention can be uniformly dispersed in a chlorine-containing polymer without damaging the thermal stabilizing effect of the stabilizer composition or the processability of the resin.

A suitable member selected from the above-exemplified organic stabilizers, plasticizers, lubricating agents and thermoplastic resins can be used as the dispersion medium. In order to attain a good dispersion state, it is preferred that the dispersion medium be liquid or molten at a temperature lower than the chlorine-containing processing temperature. For this reason, the dispersion medium preferably includes at least one member selected from plasticizers and lubricating agents (inclusive of compounds acting as internal lubricants for organic stabilizers). Preferred thermoplastic resins to be used as such dispersion medium are those that are liquid or plastic, especially liquid or molten, at a temperature lower than the chlorine-containing polymer processing temperature when they are used singly or in combination with other plasticizers or lubricating agents.

Some of the above-mentioned dispersion media that can be used in the present invention, for example, higher fatty acids, have a property of reacting with the metal component of Group II or IV of the Periodic Table in the silicate or composite thereof. However, even when such dispersion medium (C) reacts to some extent with the inorganic stabilizer (A), no particular disadvantage is brought about as far as the inorganic stabilizer (A) is substantially contained in the stabilizer composition.

Dispersion media especially suitable for attaining the objects of the present invention include (a) at least one member selected from higher fatty acids and alkali metal, alkaline earth metal, zinc, aluminum and lead salts of higher fatty acids and/or (b) an aliphatic hydrocarbon wax, and a dispersion medium including both the components (a) and (b) at a weight ratio (a) : (b) ranging from 1 : 0.3 to 1 : 3 is especially preferred.

These known dispersion media may be incorporated into the above-mentioned intimate mixtures of the silicate and organic additive by any of the above-mentioned dry-blending, mixing and kneading methods.

In case an organic hydroxyl compound is used as the organic additive, even when the silicate, the organic hydroxyl compound and other additives are mixed simultaneously, since the silicate and organic hydroxyl compound have a good compatibility with each other, it is believed that the organic hydroxyl compound is made predominatingly intimate with the silicate. Accordingly, when the organic hydroxyl compound is used as the organic additive, the blowing-preventing effect is further enhanced over the cases where other organic additives are employed.

The stabilizer composition of the present invention can be used either in a powdery form or in a granular form. In view of easiness in handling and maintenance of the activity, it is preferred that the stabilizer composition be used in a granular form.

The stabilizer composition of the granular type according to the present invention can be prepared by various compounding and granulation methods, and suitable methods are chosen depending on the kinds of the components used and the mixing ratios thereof. In this case, it is preferred that the organic additive-treated silicate be completely coated and integrated with the dispersion medium and the powdering rate in the resulting granule be lower than 20%.

For example, in case the dispersion medium used is liquid in the normal state, when the organic additive-treated silicate is mixed with the dispersion medium by using a known mixing or agitating apparatus, there can be obtained a product in which the treated silicate is covered with the dispersion medium. In case the dispersion medium is semi-solid or solid in the normal state, the treated silicate is mixed with the dispersion medium under such temperature conditions that the granulation medium is made liquid or molten, and a product such as mentioned above can be similarly obtained. In this case, elevation of the temperature may be accomplished either by external heating or by utilizing the frictional heat caused by mixing and agitation. Only one important requirement for the granulation solvent is that it should coat the inorganic stabilizer uniformly. Accordingly, the mixing condition is not necessarily such that it is completely molten, but it may be such that so called sintering is caused. In case the dispersion medium has a relatively high melting point, or in case the amount of the dispersion medium used is relatively small, it is possible to mix the treated silicate with the dispersion medium with the aid of water, a polar organic solvent such as alcohol, ether, ketone or the like or a non-polar organic solvent of the aromatic hydrocarbon type.

The so prepared mixture is granulated by suitable known granulation means selected appropriately depending on properties of the mixture. Suitable examples of such granulation means are illustrated on page 853 onward of "Handbook of Chemical Engineering" published in 1968. The mixing operation and granulation operation may be performed independently or simultaneously. Some examples of the granulation methods are described below.

a. Rolling Granulation Method:

A drum type or dish type granulator is used, and granulation is carried out by mixing the organic additive treated silicate with a liquid granulation medium.

b. Vibration Granulation Method:

Granulation is conducted in the same manner as in the method (a) except that vibrations are applied.

c. Sintering Granulation Method:

Granulation is performed by utilizing fusion of a granulation medium in a sintering furnace.

d. Mixing Granulation Method:

Granulation is performed simultaneously with mixing by using a Henschel mixer, a blender, a pin granulator or the like.

e. Fluidizing Granulation Method:

Granulation of the mixture is performed by utilizing a fluidized bed, a jetted bed or the like.

f. Pulverizing Granulation Method:

Granulation is performed by pulverizing the mixture or cooled product thereof under a shearing force.

g. Extrusion Granulation Method:

The mixture is granulated by extruding it through a die or metal gauge.

h. Injection Granulation Method (Spray-Drying Granulation Method):

The mixture containing a molten granulation medium is dispersed in the form of liquid drops into air current to cool and solidify the drops or dry them.

i. Flaking Granulation Method:

The mixture is applied on a plate in the form of a thin film and is solidified in this state, and it is granulated by its own contracting force or cutting it from the plate with a knife.

j. Dropping-on-Plate Granulation Method:

In the same manner as in the method (h) the mixture is dropped on a cooled plate, to form the mixture into semi-spherical granules.

k. Rotary Disc Granulation Method:

The mixture mentioned in (h) above is dropped on a rotating disc and the drops are scattered by a centrifugal force to form them into spherical granules.

l. Casting Granulation Method:

The mixture mentioned in (h) above is cast in a mold to effect granulation.

In order to facilitate incorporation of the stabilizer composition of the present invention, it is generally preferred that the so prepared granular stabilizer composition be controlled so that it has a particle size of 0.06 to 2 mm, especially 0.07 to 0.50 mm. The shape of the granules is not particularly critical, and an optional shape selected from spherical, semi-spherical, bead-like, cylindrical, angular, particulate, lens-like, sand grain-like and amorphous shapes can be chosen by adopting an appropriate granulation method.

The stabilizing composition of the present invention is very valuable as a stabilizer having a much reduced blowing tendency for various chlorine-containing polymers, for example, vinyl chloride resins such as vinyl chloride homopolymers and vinyl chloride copolymers, polymer blends containing vinyl chloride resins, vinylidene chloride resins, chlorinated polyolefins such as chlorinated polyethylenes and chlorinated polypropylenes, chlorinated vinyl chloride resins, chlorine-containing rubbers such as chloroprene and chlorinated isobutylene, and the like.

In addition to the foregoing components, the stabilizer composition of the present invention may further comprise various additives as so called one-package additives, for example, colorants, fillers, chemical foaming agents, surface active agents, flame retardants, fungicidal agents, antistatic agents, anti-clouding agents, and the like.

The present invention will now be described in detail by reference to the following Examples that by no means limit the scope of the invention. In these Examples, all of "parts" are by weight unless otherwise indicated.

EXAMPLE 1

This Example is given to illustrate a stabilizer composition for chlorine-containing polymers which is composed mainly of a silicate having a much reduced tendency to cause blowing at the molding step.

Calcium silicate prepared in the following method was used as a starting silicate stabilizer.

Commercially available sodium silicate (water glass No. 3) was added dropwise to sulfuric acid having a concentration of 60% by weight and was gelatinized in the highly acidic liquid. The resulting silicic acid gel was washed with water to remove sodium and sulfuric acid components. The so formed silicic acid gel was used as the starting silicic acid component. Purified calcium carbonate was sintered at about 1000° C. and thrown into water before the temperature was lowered, to obtain calcium hydroxide free of a carbonate, which was used as the starting calcium component. Both the starting components were mixed at a mole ratio of 1 : 1 as $CaO : SiO_2$, and the mixture was blended and pulverized in a pot mill according to the wet pulverization method. Then, the pulverized mixture was subjected to hydrothermal reaction in an autoclave under a pressure of 10 Kg/cm$^2$ for 3 hours, dried at 200° C. for 2 hours, calcined at 400° C. for 1 hour, and pulverized and sieved to obtain particles having a size smaller than 40 μ. The so formed calcium silicate was used as the starting silicate stabilizer.

Commercially available pentaerythritol (manufactured by Nippon Gosei Kagaku K. K.) having a Pch value greater than 6 was chosen as the organic additive.

Pentaerythritol was added to the above finely divided calcium silicate in such an amount that the silicate: pentaerythritol weight ratio was 1 : 0.6, and they were blended and kneaded to impregnate pentaerythritol in pores of the finely divided calcium silicate, whereby blowing-reduced calcium silicate (a) in which air and water included in the pores were substituted by pentaerythritol was obtained.

The pore volumes of the finely divided calcium silicate and blowing-reduced calcium silicate (a) were measured by a porosimeter of the mercury pressing type (Model AG 65 manufactured by Carloerba Co., Italy). More specifically, mercury was pressed into pores having a size of 75 to 75,000 A, and the total volume of the pores having a size of 75 to 75,000 A was measured in the unit of cc/g to obtain results shown in Table 2.

Then, 1.8 parts of the blowing-reduced calcium silicate (a) was mixed sufficiently intimately with 0.7 part of zinc stearate and 1.0 part of stearic acid, and the mixture was incorporated into 100 parts of Geon 103 EP (vinyl chloride resin manufactured by Nippon Geon). The resin composition was kneaded at 160° C. for 5 minutes by a kneading roll of a diameter of 3.5 inches to form a sheet having a thickness of 0.5 mm. The thermal stability, chlorine-catching activity and blowing property of the so obtained sheet were tested according to methods described below. Further, the dispersibility, plasticization efficiency and kneading resistance of the stabilizer composition were determined. Obtained results are shown in Table 2.

Thermal Stability:

The sample sheet was cut into a size of about 3 cm × about 10 cm, and the sample was placed in a gear oven maintained at 180° C. and exposed to this temperature condition. The state of discoloration by thermal degradation was examined at a prescribed interval. The discoloration was evaluated according to the scale of 6 grades, namely grade 0, grade 1, grade 2, grade 3, grade 4 and grade 5. Grade 0 indicates that the sample is not discolored at all, and as the discoloration advances, the grade number increases up to grade 5 which indicates that the sample is completely blackened. The thermal stability was evaluated based on the degree of thermal degradation thus determined. Further, the discoloration caused when the sample was exposed to the above temperature condition for 15 minutes was regarded as the initial discoloration and it was treated as one factor for evaluating the thermal stability.

Chlorine-Catching Activity:

The sample was cut into small pieces having a volume of about 0.5 mm³ and 2 g of these small pieces were charged in a test tube having a diameter of 1.5 cm. A Congo Red test paper wetted with glycerin was fixed to the mouth of the test tube in such a manner that the test paper did not touch the wall of the test tube. Then, the test tube was immersed in an oil bath maintained at 180° C. and the time required for hydrogen chloride to be formed by thermal decomposition of the vinyl chloride resin composition and change the color of the Congo Red test paper to blue was measured, and the thermal stability by the chlorine-catching activity was evaluated based on the thus measured time.

Blowing Property:

The sample was cut into specimens and three specimens were piled together. The assembly was preheated at 170° C. for 5 minutes and pressed under 100 Kg/cm² for 5 minutes. Then, the assembly was cold-pressed under 150 Kg/cm² for 5 minutes by using water to obtain a molded sheet having a thickness of about 1 mm. The so obtained sheet was allowed to stand still in a gear oven maintained at 190° C. for 100 minutes. The state of bubbles formed on the sheet was examined by reference to Standard Photographs for Determination of Blister according to ASTM D-714-56 and the degree of blowing was expressed by the corresponding Standard Photograph Number. When blowing was not caused, the sample is indicated as "no blister" in Tables given hereinafter.

Dispersibility:

0.05 Part of carbon black was uniformly incorporated into 100 parts of a vinyl chloride resin (Sumilite manufactured by Sumitomo Kagaku). Then, 100 parts of the mixture was kneaded with 60 parts of DOP (manufactured by Kyowa Hakko) and 6 parts of a sample stabilizer for 10 minutes by using the above-mentioned kneading roller to obtain a black sheet having a thickness of about 0.3 mm. The surface of the resulting sheet was examined. If white specks were observed on the test sheet, it indicates that the stabilizer was not well dispersed in the sheet, and as the number of such white specks is great, the dispersibility is evaluated as being worse.

Plasticization Efficiency:

A roll type mixer of a capacity of 60 cc was attached to a Plastic-Corder Model P151 (kneading resistance tester manufactured by Brabender Co.), and a mixture of 100 parts of a vinyl chloride resin (Geon 103 EP) and a sample stabilizer in an amount indicated in each run was blended and 55 g of the resulting resin blend was charged in the mixer. Kneading was carried out at 200° C. and 35 rpm. The state of plasticization of the resin composition was measured at prescribed intervals and the kneading resistance at each measurement was recorded on a chart as the torque (Kg·m). The time when the torque was at its maximum was regarded as the plasticization time (Tp) (minutes). The maximum torque ($\tau_{max}$) (Kg·m) at this point was read. The plasticization efficiency (Ep), which is a factor effective for evaluation of the processability of the vinyl chloride resin at an actual molding operation, was calculated from the so obtained results according to the following equation:

$$Ep = \tau_{max} \times Tp$$

Kneading Resistance:

According to the same method as the above method for determination of the plasticization efficiency, the maximum torque ($\tau_{max}$) (Kg·m) and the plasticization time (Tp) (minutes) were measured, and the kneading resistance (Rm) was calculated according to the following equation:

$$Rm = \tau_{max} \times 100/Tp$$

For comparison, a stabilizer was formed in the same manner as described above except that pentaerythritol was not added, and the so formed comparative calcium silicate stabilizer was incorporated into the vinyl chloride resin and formed into a sheet in the same manner as described above. The above tests were conducted in the same manner also with respect to this comparative sample. Obtained results are also shown in Table 2.

Table 2

|  | Stabilizer of Present Invention | Comparative Stabilizer (calcium silicate alone) |
| --- | --- | --- |
| Pore Volume (cc/g) | 0.98 | 3.14 |
| Pore Volume Ratio (R) | 0.30 | — |
| Thermal Stability |  |  |
| before exposure | 0 | 0 |
| after 15 minutes' exposure | 1 | 3 |
| after 30 minutes' exposure | 1 | 4 |
| after 60 minutes' exposure | 1 | 5 |
| after 90 minutes' exposure | 2 | — |
| initial discoloration | good | bad |
| blackening time (minutes) | 130 | 60 |
| Chlorine-Catching Activity (minutes) | 120 | 59 |
| Blowing Property | no blister | No. 2, medium |
| Dispersibility (number of white specks) | not observed | great |
| Plasticization Efficiency (Ep) | 19.37 | 15.39 |
| Kneading Resistance (Rm) | 45.86 | 83.25 |

From the foregoing results, it will readily be understood that when air or the like included in pores of finely divided calcium silicate is replaced by pentaerythritol which is an organic hydroxyl compound additive having a good compatibility with a silicate and the pore volume ratio (R) in the calcium silicate is thus reduced, if this calcium silicate is incorporated in a vinyl chloride resin, the blowing tendency is greatly reduced and such desirable effects as of improving the thermal stability synergistically, increasing the kneading efficiency, improving the dispersibility of the silicate into the resin and preventing blooming of the organic hydroxyl compound additive from the resin can be obtained.

EXAMPLE 2

In this Example, various kinds of calcium silicate differing in the pore volume were used as the stabilizer and stabilizer compositions having a reduced blowing tendency at the molding step were prepared therefrom.

Calcium silicate prepared by the hydrothermal synthesis method described in Example 1 was used as the starting calcium silicate, and it was dried at 200° C. for 2 hours. The dried calcium silicate as it was or after it had been calcined at 300°, 600°, 800°, 1000° or 1200° C. for 1 hour, was pulverized and sieved to obtain particles having a size not larger than 40 μ. With respect to each of the so obtained 6 calcium silicates, the pore volume was measured by a porosimeter of the mercury pressing type.

Pentaerythritol chosen as the organic additive was added to the calcium silicate at a calcium silicate: organic additive weight ratio of 1 : 0.6, and the mixture was kneaded. Thus, there were obtained blowing-reduced calcium silicates (b) to (g).

In the same manner as described in Example 1, 1.8 parts of the calcium silicate stabilizer sample was incorporated into 100 parts of a vinyl chloride resin (Geon 103 EP), and 0.7 part of zinc stearate and 1.0 part of stearic acid were further incorporated. The resulting mixture was kneaded and molded into a sheet. The thermal stability, chlorine-catching activity and blowing property of the so obtained sheet were tested, and the dispersibility, plasticization efficiency and kneading resistance of the silicate stabilizer sample were determined. Obtained results are shown in Table 3.

Table 3

|  | Stabilizer Sample | | | | | |
| --- | --- | --- | --- | --- | --- | --- |
|  | (b) | (c) | (d) | (e) | (f) | (g) |
| Calcination Temperature (° C.) | 200 (as-dried) | 300 | 600 | 800 | 1000 | 1200 |
| Pore Volume (cc/g) of Calcined Calcium Silicate | 4.20 | 3.65 | 3.15 | 3.10 | 0.90 | 0.40 |
| Pore Volume (cc/g) of Blowing-Reduced Calcium Silicate | 1.32 | 1.07 | 0.98 | 0.98 | 0.77 | 0.79 |
| Pore Volume Ratio (R) | 0.31 | 0.29 | 0.31 | 0.32 | 0.85 | 1.98 |
| Thermal Stability |  |  |  |  |  |  |
| before exposure | 0 | 0 | 0 | 0 | 0 | 0 |
| after 15 minutes' exposure | 1 | 1 | 1 | 1 | 2 | 2 |
| after 30 minutes' exposure | 1 | 1 | 1 | 1 | 3 | 3 |
| after 60 minutes' exposure | 1 | 1 | 1 | 1 | 4 | 4 |
| after 90 minutes' exposure | 2 | 2 | 2 | 2 | 5 | 5 |
| initial discoloration | good | good | good | good | slightly bad | slightly bad |
| blackening time (min) | 130 | 130 | 130 | 130 | 90 | 90 |
| Chlorine-Catching Activity (minutes) | 122 | 121 | 122 | 120 | 86 | 80 |
| Blowing Property | no blister | no blister | no blister | no blister | no blister | no blister |
| Dispersibility (white specks) | none | none | none | none | none | 10 |
| Plasticization Efficiency (Ep) | 19.54 | 19.25 | 19.67 | 20.08 | 17.82 | 16.56 |
| Kneading Resistance (Rm) | 46.34 | 45.93 | 42.62 | 45.64 | 32.38 | 30.65 |

From the above results, it will readily be understood that when pentaerythritol as an organic additive is incorporated into calcium silicate having a pore volume specified in the present invention to adjust the pore volume ratio (R) within the range specified in the present invention, the blowing tendency is much reduced and in the resulting stabilizer composition the organic additive and calcium silicate exhibit synergistically high effects of improving the thermal stability, processability, dispersibility and anti-blooming property. In contrast, when pentaerythritol is incorporated into calcium silicate having too small a pore volume, the blooming tendency of pentaerythritol is observed and no good results are obtainable as regards the thermal stability.

EXAMPLE 3

In this Example, stabilizer compositions having a reduced blowing tendency at the molding step, which were prepared by using various silicates, are illustrated.

Lead silicate, magnesium silicate, barium silicate, zinc silicate, strontium silicate, lead-calcium silicate and calcium-zinc silicate, which were prepared according to the methods described below, were used as the starting silicates. Preparation of Lead Silicate:

A commercially available aqueous solution of sodium silicate (water glass No. 2) was used as the starting silicic acid component and an aqueous solution of lead acetate prepared by dissolving litharge in acetic acid was used as the starting lead component. Both the solutions were gradually mixed by simultaneous pouring under agitation over a period of 60 minutes at such a mixing ratio that the PbO: $SiO_2$ oxide mole ratio was 1:3. The pH of the mixture was adjusted to 6.5 to 7.5 by addition of a 10% aqueous solution of sodium hydroxide, and the mixture was aged for 60 minutes. The resulting white slurry of lead silicate was filtered, washed with water, dried at 200° C. for 24 hours, pulverized and sieved to obtain a finely divided lead silicate sample having a particle size not larger than 40 μ.

Preparation of Magnesium Silicate (a):

Commercially available finely divided silicic acid (Aerosil No. 200 manufactured by Nippon Aerosil K. K.) was used as the starting silicic acid component, and commercially available magnesium oxide was used as the starting magnesium component. Both the components were mixed at such a mixing ratio that the MgO: $SiO_2$ oxide mole ratio was 1:1. The mixture was blended and pulverized in a pot mill according to the wet method, and it was then calcined at 800° C. for 2 hours, pulverized and sieved to obtain a magnesium silicate (a) sample having a particle size not larger than 40 μ.

Preparation of Barium Silicate:

Commercially available sodium metasilicate of the first grade was used as the starting silicic acid component, and commercially available barium chloride was used as the starting barium component. Both the components were mixed at such a mixing ratio that the BaO : $SiO_2$ oxide mole ratio was 1 : 1. The mixture was subjected to the double decomposition according to the wet method in a pot mill, and the resulting white slurry was filtered, washed with water, dried at 200° C. for 24 hours, pulverized and sieved to obtain a barium silicate sample having a particle size not larger than 40 μ.

Preparation of Zinc Silicate:

The silicic acid gel prepared in the same manner as described in Example 1 was used as the starting silicic acid component, and commercially available zinc flower (Zinc Flower No. 1) was used as the starting zinc component. Both the components were mixed at such a mixing ratio that the ZnO : $SiO_2$ mole ratio was 1 : 1, and the mixture was blended and pulverized in a pot mill according to the wet method, calcined at 400° C. for 3 hours to effect reaction, and pulverized and sieved to obtain a zinc silicate sample having a particle size not larger than 40 μ.

Preparation of Strontium Silicate:

Commercially available finely divided silicic acid (Syloid 244 manufactured by Fuji Davison Kagaku) was used as the starting silicic acid component, and commercially available strontium hydroxide was used as the starting strontium component. Both the components were mixed at such a mixing ratio that the SrO : $SiO_2$ oxide mole ratio was 1 : 1. The mixture was blended and pulverized in a pot mill according to the wet method, subjected to the hydrothermal reaction in an autoclave under 13 Kg/cm² for 3 hours, dried at 200° C. for 24 hours, pulverized and sieved to obtain a strontium silicate sample having a particle size not larger than 40 μ.

Preparation of Calcium Silicate (h):

Acid-treated active clay was used as the starting silicic acid component, and calcium hydroxide prepared in the same manner as described in Example 1 was used as the starting calcium component. Both the components were mixed at such a mixing ratio that the CaO : $SiO_2$ oxide mole ratio was 1 : 1. The mixture was blended and pulverized in a pot mill according to the wet method, dried at 200° C. for 24 hours, pulverized and sieved to obtain a calcium silicate (h) sample having a particle size not larger than 40 μ.

Preparation of Calcium Silicate (i):

Naturally occurring diatomaceous earth was used as the starting silicic acid component, and calcium hydroxide prepared in the same manner as described in Example 1 was used as the starting calcium component. Both the components were mixed at such a mixing ratio that the CaO : $SiO_2$ oxide mole ratio was 1 : 1. The mixture was blended and pulverized in a pot mill according to the wet method, dried at 200° C. for 24 hours, pulverized and sieved to obtain a calcium silicate (i) sample having a particle size not larger than 40 μ.

Preparation of Magnesium Silicate (b):

Naturally occurring talc (sold under the tradename "Mistron Vapor") was purified, and the purified product was used as a magnesium silicate (b) sample. Preparation of Lead-Calcium Composite Silicate:

Commercially available sodium metasilicate of the first grade was used as the starting silicic acid component, commercially available lead silicate of the reagent class was used as the starting lead component, and commercially available calcium chloride of the reagent class was used as the starting calcium component. The three starting components were mixed at such a mixing ratio that the PbO : CaO : $SiO_2$ oxide mole ratio was 1 : 1: 2. The mixture was subjected to hydrothermal reaction in a pot mill, and the resulting white slurry was filtered, washed with water, dried at 200° C. for 24 hours, pulverized and sieved to obtain a lead-calcium silicate sample having a particle size not larger than 40 μ.

Preparation of Calcium-Zinc Composite Silicate:

The same starting silicic acid and calcium components as prepared in Example 1 were used, and commercially available zinc flower (Zinc Flower No. 1) was used as the starting zinc component. The three components were mixed at such a mixing ratio that the CaO : ZnO : $SiO_2$ oxide mole ratio was 2 : 1 : 4. The mixture was blended and pulverized in a pot mill according to the wet method, subjected to hydrothermal reaction in an autoclave under 10 Kg/cm² for 3 hours, dried at 200° C. for 24 hours, pulverized and sieved to obtain calcium-zinc silicate sample having a particle size not larger than 40 μ.

As in Example 1, pentaerythritol was used as an organic hydroxyl compound having a Pch value of at least 6.

The finely divided silicate prepared according to the method described above was mixed with pentaerythritol as the organic additive at a mixing ratio of 1 : 0.6. The mixture was blended and kneaded to impregnate pentaerythritol into pores of the silicate and substitute air or the like included in the pores by pentaerythritol, whereby a blowing-reduced silicate was formed.

The pore volumes of the finely divided silicate not treated with pentaerythritol and of the blowing-reduced silicates were measured according to the method described in Example 1 to obtain results shown in Table 4.

In the same manner as described above, 1.8 parts of the so obtained blowing-reduced silicate was mixed homogeneously with 0.7 part of zinc stearate and 1.0 part of stearic acid as a lubricating agent. The resulting stabilizer composition was incorporated into 100 parts of a vinyl chloride resin (Geon 103 EP), and in the same manner as described in Example 1, the thermal stability, chlorine-catching activity, blowing property, dispersibility, plasticization efficiency and kneading resistance were determined to obtain results shown in Table 4.

For comparison, each of the above silicates not treated with pentaerythritol was incorporated into the vinyl chloride resin in the same manner as described above, and each measurement test was conducted. Obtained results are also shown in Table 4.

From the results shown in Table 4, it will readily be understood that when pentaerythritol is incorporated in silicates having a pore volume within the range specified in the present invention, the blowing tendency is much reduced and there are obtained stabilizer compositions which can highly improve the thermal stability, processability, dispersibility and antiblowing property by synergistic effects of the silicate and pentaerythritol.

Table 4

| | Silicate | | |
|---|---|---|---|
| Magnesium | Magnesium | Barium | Zinc |

Table 4-continued

|  | Lead Silicate | Silicate(a) | Silicate(b) | Silicate | Silicate |
|---|---|---|---|---|---|
| Pore Volume (cc/g) of Silicate | 2.25 | 1.48 | 0.99 | 2.18 | 1.23 |
| Pore Volume (cc/g) of Blowing-Reduced Silicate | 0.96 | 0.53 | 0.57 | 0.95 | 0.51 |
| Pore Volume Ratio (R) | 0.43 | 0.36 | 0.58 | 0.44 | 0.41 |
| Thermal Stability |  |  |  |  |  |
| before exposure | 0 | 0 | 0 | 0 | 0 |
| after 15 minutes' exposure | 0 | 1 | 1 | 1 | 0 |
| after 30 minutes' exposure | 1 | 1 | 2 | 1 | 4 |
| after 60 minutes' exposure | 1 | 1 | 2 | 1 | 5 |
| after 90 minutes' exposure | 2 | 2 | 3 | 2 |  |
| initial discoloration | good | good | good | good | good |
| blackening time (min) | 120 | 140 | 100 | 145 | 60 |
| Chlorine-Catching Activity (minutes) | 116 | 125 | 97 | 133 | 56 |
| Blowing Property | no blister | no blister | no blister | no blister | no blister |
| Dispersibility (white specks) | none | none | none | none | none |
| Plasticization Efficiency (Ep) | 20.57 | 18.69 | 17.25 | 21.26 | 17.62 |
| Kneading Resistance (Rm) | 46.12 | 43.26 | 41.27 | 47.82 | 43.57 |

|  | Silicate | | | | |
|---|---|---|---|---|---|
|  | Strontium Silicate | Calcium Silicate(h) | Calcium Silicate(i) | Lead-Calcium Silicate | Calcium-Zinc Silicate |
| Pore Volume (cc/g) of Silicate | 3.02 | 1.43 | 1.41 | 2.07 | 3.03 |
| Pore Volume (cc/g) of Blowing-Reduced Silicate | 0.97 | 0.68 | 0.72 | 0.92 | 0.96 |
| Pore Volume Ratio (R) | 0.32 | 0.48 | 0.51 | 0.44 | 0.32 |
| Thermal Stability |  |  |  |  |  |
| before exposure | 0 | 0 | 0 | 0 | 0 |
| after 15 minutes' exposure | 0 | 1 | 1 | 0 | 0 |
| after 30 minutes' exposure | 1 | 1 | 1 | 1 | 1 |
| after 60 minutes' exposure | 1 | 2 | 2 | 1 | 1 |
| after 90 minutes' exposure | 2 | 2 | 2 | 2 | 3 |
| initial discoloration | good | good | good | good | good |
| blackening time (min) | 140 | 120 | 120 | 145 | 110 |
| Chlorine-Catching Activity (minutes) | 128 | 118 | 112 | 135 | 106 |
| Blowing Property | no blister | no blister | no blister | no blister | no blister |
| Dispersibility (white specks) | none | none | none | none | none |
| Plasticization Efficiency (Ep) | 18.96 | 19.19 | 19.23 | 21.63 | 20.78 |
| Kneading Resistance (Rm) | 45.32 | 45.89 | 44.77 | 47.63 | 45.79 |

|  | Silicate | | | | |
|---|---|---|---|---|---|
|  | Lead Silicate (comparison) | Magnesium Silicate(a) (comparison) | Magnesium Silicate(b) (comparison) | Barium Silicate (comparison) | Zinc Silicate (comparison) |
| Pore Volume (cc/g) of Silicate | 2.25 | 1.09 | 0.99 | 2.18 | 2.12 |
| Pore Volume (cc/g) of Blowing-Reduced Silicate | — | — | — | — | — |
| Pore Volume Ratio (R) | — | — | — | — | — |
| Thermal Stability |  |  |  |  |  |
| before exposure | 0 | 0 | 0 | 0 | 0 |
| after 15 minutes' exposure | 0 | 3 | 3 | 3 | 3 |
| after 30 minutes' exposure | 1 | 4 | 4 | 4 | 5 |
| after 60 minutes' exposure | 3 | 5 | 5 | 5 |  |
| after 90 minutes' exposure | 4 |  |  |  |  |
| initial discoloration | good | bad | bad | bad | bad |
| blackening time (min) | 97 | 60 | 60 | 60 | 30 |
| Chlorine-Catching Activity (minutes) | 86 | 55 | 43 | 62 | 42 |
| Blowing Property | No. 2, medium dense | No. 2, medium | No. 2, medium | No. 2, medium | No. 2, medium dense |
| Dispersibility (white specks) | numerous | numerous | numerous | numerous | numerous |
| Plasticization Efficiency (Ep) | 12.69 | 13.34 | 16.35 | 9.69 | 12.69 |
| Kneading Resistance (Rm) | 100.72 | 87.34 | 52.68 | 113.45 | 77.68 |

|  | Silicate | | | | |
|---|---|---|---|---|---|
|  | Strontium Silicate (comparison) | Calcium Silicate(h) (comparison) | Calcium Silicate(i) (comparison) | Lead-Calcium Silicate (comparison) | Calcium-Zinc Silicate (comparison) |
| Pore Volume (cc/g) of Silicate | 3.02 | 1.43 | 1.41 | 2.07 | 3.03 |
| Pore Volume (cc/g) of Blowing-Reduced Silicate | — | — | — | — | — |
| Pore Volume Ratio (R) | — | — | — | — | — |
| Thermal Stability |  |  |  |  |  |
| before exposure | 0 | 0 | 0 | 0 | 0 |
| after 15 minutes' exposure | 3 | 3 | 3 | 1 | 0 |
| after 30 minutes' exposure | 4 | 4 | 4 | 2 | 3 |
| after 60 minutes' exposure | 5 | 5 | 5 | 3 | 5 |
| after 90 minutes' exposure |  |  |  | 5 |  |
| initial discoloration | bad | bad | bad | good | good |
| blackening time (min) | 60 | 60 | 60 | 90 | 60 |
| Chlorine-Catching Activity (minutes) | 58 | 56 | 54 | 78 | 58 |
| Blowing Property | No. 2, medium | No. 2, medium | No. 2, medium | No. 2, medium | No. 2, medium |
| Dispersibility (white specks) | numerous | numerous | numerous | numerous | numerous |
| Plasticization Efficiency (Ep) | 13.88 | 15.77 | 15.68 | 11.68 | 15.72 |
| Kneading Resistance (Rm) | 96.32 | 76.32 | 75.38 | 118.95 | 89.36 |

EXAMPLE 4

This Example illustrates stabilizer compositions having a reduced blowing tendency, which were prepared by incorporating various organic hydroxyl compounds into calcium silicate.

Calcium silicate (a) (1.1 parts) prepared according to the method described in Example 1 was mixed with an organic hydroxyl compound additive selected from polyethylene glycol, glycerin, stearic acid monoglyceride, Span 60, sorbitol, mannitol, pentaerythritol, pentaerythritol distearate, glucose and bisphenol A to form a blowing-reduced calcium silicate stabilizer having a composition indicated in Table 5. The blowing-reduced silicate stabilizer was mixed uniformly with 0.7 part of zinc stearate and 1.0 part of stearic acid as a lubricating agent. In this manner, there were prepared 10 stabilizer compositions (4-1) to (4-10). With respect to each of these stabilizer compositions, the thermal stability, chlorine-catching property, blowing property, dispersibility, plasticization efficiency and kneading resistance were tested in the same manner as described in Example 1 to obtain results shown in Table 5.

From the results shown in Table 5, it will readily be understood that when an organic hydroxyl compound is incorporated into calcium silicate having a Pch value within the range specified in the present invention to reduce the pore volume ratio, the blowing tendency can be conspicuously reduced and the thermal stability and other various characteristics can be highly improved.

Table 5

| | Stabilizer No. | | | | |
|---|---|---|---|---|---|
| | 4-1 | 4-2 | 4-3 | 4-4 | 4-5 |
| Organic Hydroxyl Compound (parts) | | | | | |
| polyethylene glycol | 0.4 | | | | |
| glycerin | | 0.4 | | | |
| stearic acid monoglyceride | | | 0.4 | | |
| Span 60 | | | | 0.4 | |
| sorbitol | | | | | 0.7 |
| mannitol | | | | | |
| pentaerythritol | 0.3 | 0.3 | 0.3 | 0.3 | |
| pentaerythritol distearate | | | | | |
| glucose | | | | | |
| bisphenol-A | | | | | |
| Pore Volume (cc/g) of Organic Hydroxyl Compound-Treated Silicate | 0.61 | 0.62 | 0.73 | 0.74 | 0.92 |
| Pore Volume Ratio (R) | 0.19 | 0.20 | 0.23 | 0.24 | 0.29 |

| | 4-6 | 4-7 | 4-8 | 4-9 | 4-10 |
|---|---|---|---|---|---|
| Organic Hydroxyl Compound (parts) | | | | | |
| polyethylene glycol | | | | | |
| glycerin | | | | 0.3 | |
| stearic acid monoglyceride | | | | | 0.4 |
| Span 60 | | | | | |
| sorbitol | | 0.3 | | | 0.3 |
| mannitol | 0.7 | | | | |
| pentaerythritol | | | 0.4 | | |
| pentaerythritol distearate | | 0.4 | | | |
| glucose | | | | 0.4 | |
| bisphenol-A | | | 0.3 | | |
| Pore Volume (cc/g) of Organic Hydroxyl Compound-Treated Silicate | 0.95 | 0.68 | 0.66 | 0.74 | 0.78 |
| Pore Volume Ratio (R) | 0.30 | 0.22 | 0.21 | 0.24 | 0.25 |

| | 4-1 | 4-3 | 4-4 | 4-4 | 4-5 |
|---|---|---|---|---|---|
| Thermal Stability | | | | | |
| before exposure | 0 | 0 | 0 | 0 | 0 |
| after 15 minutes' exposure | 1 | 1 | 1 | 1 | 1 |
| after 30 minutes' exposure | 1 | 1 | 1 | 2 | 2 |
| after 60 minutes' exposure | 1 | 1 | 1 | 2 | 2 |
| after 90 minutes' exposure | 2 | 2 | 2 | 2 | 2 |
| initial discoloration | good | good | good | good | good |
| blackening time (min) | 120 | 130 | 120 | 120 | 140 |
| Chlorine-Catching | 116 | 120 | 117 | 122 | 125 |
| Blowing Property | no blister | no blister | no blister | no blister | no blister |
| Dispersibility (white specks) | none | none | none | none | none |
| Plasticization Efficiency (Ep) | 18.24 | 18.96 | 17.42 | 17.26 | 18.62 |
| Kneading Resistance (Rm) | 42.63 | 43.28 | 41.65 | 42.72 | 44.18 |

| | 4-6 | 4-7 | 4-8 | 4-9 | 4-10 |
|---|---|---|---|---|---|
| Thermal Stability | | | | | |
| before exposure | 0 | 0 | 0 | 0 | 0 |
| after 15 minutes' exposure | 1 | 1 | 1 | 1 | 1 |
| after 30 minutes' exposure | 2 | 1 | 1 | 1 | 2 |
| after 60 minutes' exposure | 2 | 2 | 1 | 2 | 2 |
| after 90 minutes' exposure | 2 | 2 | 2 | 2 | 2 |
| initial discoloration | good | good | good | good | good |
| blackening time (min) | 140 | 130 | 130 | 110 | 120 |
| Chlorine-Catching | 124 | 115 | 126 | 110 | 117 |
| Blowing Property | no blister | no blister | no blister | no blister | no blister |
| Dispersibility (white specks) | none | none | none | none | none |
| Plasticization Efficiency (Ep) | 18.65 | 13.58 | 19.68 | 15.39 | 15.55 |
| Kneading Resistance (Rm) | 44.23 | 36.29 | 45.92 | 42.18 | 40.67 |

EXAMPLE 5

This Example illustrates stabilizer compositions for chlorine-containing polymers, which were prepared by changing the mixing ratio of the silicate and organic hydroxyl compound in various manners.

The pentaerythritol-treated blowing-reduced calcium silicate prepared in Example 1, the pentaerythritol-treated blowing-reduced lead silicate prepared in Example 3 and the mannitol-treated blowing-reduced calcium silicate prepared in Example 4 were chosen as the blowing-reduced silicate stabilizer according to the present invention. In these silicate stabilizers the mixing ratio of the silicate and organic hydroxyl compound was changed as indicated in Table 6 to form stabilizer compositions. Then, the stabilizer sample was mixed uniformly with 0.7 part of zinc stearate and 1.0 part of stearic acid in the same manner as described in Example 1. There were thus prepared 15 stabilizer compositions as shown in Table 6. With respect to each of these stabilizer compositions, the thermal stability, chlorine-catching property, blowing property, dispersibility, plasticization efficiency and kneading resistance were determined in the same manner as described in Example 1 to obtain results shown in Table 6.

For comparison, the organic hydroxyl compound alone was incorporated into the vinyl chloride resin without using the silicate, and the above properties were determined in the same manner. Obtained results are also shown in Table 6.

In Table 6, asterisked samples were comparative samples where the mixing ratio of the silicate and organic hydroxyl compound was outside the range specified in the present invention.

From the results shown in Table 6, it will readily be understood that the composite stabilizer compositions prepared by mixing the silicate and organic hydroxyl compound at a mixing ratio within the range specified in the present invention have a much reduced blowing tendency and exhibit very good test results, whereas comparative compositions where the above mixing ratio is outside the range specified in the present invention or no silicate is incorporated are inferior in various properties and cannot be put into practical used conveniently, Table 6

| | Stabilizer No. | | | | | |
|---|---|---|---|---|---|---|
| | 1 | 3 | 4 | 5-1* | 5-2 | 5-3* |
| Silicate (parts) | | | | | | |
| calcium silicate | 1.1 | | 1.1 | 1.7 | 1.6 | 0.2 |
| lead silicate | | 1.1 | | | | |
| Organic Hydroxyl Compound (parts) | | | | | | |
| pentaerythritol | 0.7 | 0.7 | | 0.1 | 0.2 | 1.6 |
| mannitol | | | 0.7 | | | |
| Pore Volume (cc/g) of Organic Hydroxyl Compound-Treated Silicate | 0.98 | 0.96 | 0.95 | 1.48 | 1.40 | 0.78 |
| Pore Volume Ratio (R) | 0.30 | 0.43 | 0.30 | 0.47 | 0.44 | 0.25 |
| Thermal Stability | | | | | | |
| before exposure | 0 | 0 | 0 | 0 | 0 | 0 |
| after 15 minutes' exposure | 1 | 0 | 1 | 2 | 2 | 0 |
| after 30 minutes' exposure | 1 | 1 | 2 | 3 | 2 | 4 |
| after 60 minutes' exposure | 1 | 1 | 2 | 4 | 3 | 5 |
| after 90 minutes' exposure | 2 | 2 | 2 | 5 | 4 | |
| initial discoloration | good | good | good | slightly bad | slightly bad | good |
| blackening time (min) | 130 | 120 | 140 | 90 | 105 | 60 |

| | 5-4 | 5-5* | 5-6 | 5-7* | 5-8 | 5-9* |
|---|---|---|---|---|---|---|
| Silicate (parts) | | | | | | |
| calcium silicate | 0.4 | | | | | 1.7 |
| lead silicate | | 1.7 | 1.6 | 0.2 | 0.4 | |
| Organic Hydroxyl Compound (parts) | | | | | | |
| pentaerythritol | 1.4 | 0.1 | 0.2 | 1.6 | 1.4 | |
| mannitol | | | | | | 0.1 |
| Pore Volume (cc/g) of Organic Hydroxyl Compound-Treated Silicate | 0.73 | 1.06 | 1.00 | 0.79 | 0.77 | 1.42 |
| Pore Volume Ratio (R) | 0.23 | 0.47 | 1.44 | 0.35 | 0.34 | 0.45 |
| Thermal Stability | | | | | | |
| before exposure | 0 | 0 | 0 | 0 | 0 | 0 |
| after 15 minutes' exposure | 0 | 0 | 0 | 0 | 0 | 2 |
| after 30 minutes' exposure | 1 | 1 | 1 | 4 | 1 | 3 |
| after 60 minutes' exposure | 2 | 3 | 2 | 5 | 2 | 4 |
| after 90 minutes' exposure | 4 | 5 | 4 | | 3 | 5 |
| initial discoloration | good | good | good | good | good | slightly bad |
| blackening time (min) | 110 | 90 | 100 | 60 | 100 | 90 |

| | 5-10 | 5-11* | 5-12 | Control | Control |
|---|---|---|---|---|---|
| Silicate (parts) | | | | | |
| calcium silicate | 1.6 | 0.2 | 0.4 | | |
| lead silicate | | | | | |
| Organic Hydroxyl Compound (parts) | | | | | |
| pentaerythritol | | | | 1.8 | |
| mannitol | 0.2 | 1.6 | 1.4 | | 1.8 |
| Pore Volume (cc/g) of Organic Hydroxyl Compound-Treated Silicate | 1.38 | 0.76 | 0.71 | — | — |
| Pore Volume Ratio (R) | 0.44 | 0.24 | 0.23 | — | — |
| Thermal Stability | | | | | |
| before exposure | 0 | 0 | 0 | 0 | 0 |
| after 15 minutes' exposure | 2 | 1 | 1 | 4 | 4 |
| after 30 minutes' exposure | 2 | 4 | 2 | 5 | 5 |
| after 60 minutes' exposure | 3 | 5 | 3 | | |
| after 90 minutes' exposure | 4 | 4 | | | |
| initial discoloration | slightly bad | good | good | bad | bad |
| blackening time (min) | 110 | 60 | 115 | 30 | 30 |

| | 1 | 3 | 4 | 5-1* | 5-2 | 5-3* |
|---|---|---|---|---|---|---|
| Chlorine-Catching Activity (min) | 120 | 116 | 124 | 78 | 88 | 58 |
| Blowing Property | no blister | no blister | no blister | No. 4, medium | No. 6, few | no blister blooming |
| Dispersibility (white specks) | none | none | none | none | none | blooming |
| Plasticization Efficiency (Ep) | 19.37 | 20.57 | 18.65 | 13.36 | 14.54 | 12.68 |
| Kneading Resistance (Rm) | 45.86 | 46.12 | 44.23 | 72.37 | 63.51 | 8.64 |

| | 5-4 | 5-5* | 5-6 | 5-7* | 5-8 | 5-9* |
|---|---|---|---|---|---|---|
| Chlorine-Catching Activity (min) | 92 | 73 | 81 | 52 | 90 | 79 |
| Blowing Property | no blister | No. 4, medium few | No. 6 blister | no blister | no medium | No. 4, |
| Dispersibility (white specks) | none | few | none | blooming | none | blooming |
| Plasticization Efficiency (Ep) | 13.68 | 17.68 | 15.34 | 12.12 | 13.35 | 13.52 |

Table 6-continued

| Kneading Resistance (Rm) | Stabilizer No. | | | | | |
|---|---|---|---|---|---|---|
| | 9.52 | 80.67 | 71.38 | 9.18 | 9.81 | 71.63 |
| | 5-10 | 5-11* | 5-12 | Control | Control | |
| Chlorine-Catching Activity (min) | 92 | 60 | 95 | 29 | 32 | |
| Blowing Property | No. 6, few | no blister | no blister | no blister | no blister | |
| Dispersibility (white specks) | none | blooming | none | blooming | blooming | |
| Plasticization Efficiency (Ep) | 14.56 | 11.38 | 12.19 | not gelled | not gelled | |
| Kneading Resistance (Rm) | 62.78 | 8.27 | 9.65 | not gelled | not gelled | |

EXAMPLE 6

This Example illustrates effects attained when a stabilizer composition comprising a blowing-reduced silicate formed by mixing an organic hydroxyl compound into a silicate was incorporated into a soft vinyl chloride resin.

A stabilizer composition (sample No. 6-1) was prepared by homogeneously mixing 1.8 parts of the pentaerythritol-treated calcium silicate prepared in Example 1 with 0.7 part of zinc stearate and 0.5 part of solid paraffin as a lubricating agent.

Another stabilizer composition (sample No. 6-2) was prepared by homogeneously mixing 1.8 parts of the pentaerythritol-treated lead silicate prepared in Example 3 with 0.7 part of lead stearate and 0.5 part of solid paraffin as a lubricating agent.

Still another stabilizer composition (sample No. 6-3) was prepared by homogeneously mixing 1.8 parts of the glycerin-treated calcium silicate prepared in Example 4 with 0.7 part of lead stearate and 0.5 part of solid paraffin as a lubricating agent.

The so prepared stabilizer composition (5.0 parts) was incorporated into a mixture of 100 parts of a vinyl chloride resin (Vinychloray 40000 M) and 50 parts of DOP (manufactured by Kyowa Hakko) as a plasticizer, and the resulting mixture was kneaded at 150° C. for 10 minutes by a kneading roll to obtain a sheet having a thickness of about 0.5 mm. Then, the sheet was pressed under an actual pressure of 100 Kg/cm² at 160° C. for 10 minutes to obtain a sheet having a thickness of about 1.0 mm. The thermal stability of the so molded sheet was determined according to JIS K-6723 1969, Section 7—7 and the volume resistivity was measured according to JIS K-6723 1969, Section 7-8. The transparency was also evaluated according to the scale of a ⊚ : very excellent, ○ : excellent and x : opaque. Results are shown in Table 7.

For comparison, 5 parts of a stabilizer composition formed by homogeneously mixing 1.8 parts of tribasic lead sulfate with 0.7 part of stearic acid and 0.5 part of solid paraffin was incorporated into 100 parts of the vinyl chloride resin in the same manner as described above. The resulting mixture was molded into a sheet in the same manner as described above, and the above tests were conducted in the same manner. Obtained results are also shown in Table 7.

From the results shown in Table 7, it will readily be understood that a soft vinyl chloride resin composition including a composite stabilizer composition formed by mixing an organic hydroxyl compound into a silicate does not cause blowing at the molding step and is excellent in the thermal stability and insulating property (volume resistivity). Further, this stabilizer composition is much less toxic than the comparative tribasic lead sulfate type stabilizer and is excellent in the transparency. Accordingly, this soft vinyl chloride resin composition including the stabilizer composition according to the present invention can be used very suitably for production of coated wires, agricultural vinyl chloride resin sheets and vinyl chloride resin bottles.

Table 7

| | Stabilizer Composition Sample No. | | | |
|---|---|---|---|---|
| | 6-1 | 6-2 | 6-3 | Comparison |
| Thermal Stability (min) | 146 | 149 | 124 | 217 |
| Volume Resistivity (Ω-cm) | $8.8 \times 10^{13}$ | $9.8 \times 10^{13}$ | $8.6 \times 10^{13}$ | $9.0 \times 10^{13}$ |
| Transparency | ○ | ⊚ | | x |

EXAMPLE 7

This Example illustrates the method for compounding calcium silicate and an organic hydroxyl compound for forming a composite stabilizer and changes of various characteristics caused by changing the shape or size of the stabilizer.

1.1 Parts of calcium silicate (a) prepared in the same manner as described in Example 1 was mixed homogeneously with 0.7 part of pentaerythritol as an organic hydroxyl compound and 0.7 part of zinc stearate and 1.0 part of stearic acid as a lubricating agent to form a powdery stabilizer composition (7-1).

The so obtained powdery stabilizer composition (7-1) was kneaded at 130° C. for 30 minutes by means of a kneader, and the kneaded composition was extruded and granulated into columns of a diameter of 1 mm to obtain a granular stabilizer composition (7-2).

1.1 Parts of the above-mentioned calcium silicate (a) was mixed with 0.7 part of pentaerythritol as an organic hydroxyl compound by means of a mixer, and 1.8 parts of the resulting mixture as the main stabilizer was mixed homogeneously with 0.7 part of zinc stearate and 1.0 part of stearic acid as a lubricating agent to form a powdery stabilizer composition (7-3).

The above powdery stabilizer composition (7-3) was kneaded at 130° C. for 30 minutes, and extruded and granulated into columns of a diameter of 1 mm to obtain a granular stabilizer composition (7-4).

The calcium silicate-pentaerythritol mixture obtained intermediately when the powdery stabilizer composition (7-3) was prepared was sufficiently kneaded at 130° C. by using a kneading roller to form a homogeneous composition. Then, 1.8 parts of the so obtained intimate composition as the main stabilizer was mixed homogeneously with 0.7 part of zinc stearate and 1.0 part of stearic acid as a lubricating agent to form a powdery stabilizer composition (7-5).

The so obtained powdery stabilizer composition (7-5) was kneaded at 130° C. for 30 minutes by means of a kneader and extruded and granulated into columns having a diameter of 1 mm to obtain a granular stabilizer composition (7-6).

The foregoing stabilizer compositions were incorporated into a vinyl chloride resin, and sheets were prepared from the resulting vinyl resin compositions. Properties of the resulting sheets and the stabilizer compositions, namely the thermal stability, chlorine-catching activity, blowing property, dispersibility, plasticization efficiency and kneading resistance, were determined in the same manner as described in Example 1 to obtain results shown in Table 8.

From the results shown in Table 8, it will readily be understood that when an organic hydroxyl compound is incorporated into a silicate stabilizer to reduce the pore volume ratio and the compounding operation is performed sufficiently to obtain a homogeneous mixture, even if other lubricating agent and plasticizer are present in the mixture at the compounding step, blowing can be greatly reduced at the step of processing a vinyl chloride resin composition and good effects can be obtained as regards various properties.

cose, bisphenol A and polypentaerythritol (a mixture of di-, tri- and tetra-pentaerythritols). As the lubricating agent, there were chosen commercially available calcium stearate, zinc stearate, stearic acid, polyethylene wax, microcrystalline wax, solid paraffin and mineral oil wax. These components were mixed according to recipes indicated in Table 9 to obtain 19 composite stabilizer compositions (8-1) to (8-19).

Compositions (8-1), (8-4), (8-7) and (8-10) were kneaded at 130° C. for 30 minutes by means of a kneader and extruded and granulated into columns having a diameter of 1 mm according to the same method as adopted in Example 7 for production of the stabilizer composition (7-2). Compositions (8-2), (8-3), (8-5), (8-6), (8-8), (8-9), (8-11) and (8-19) were molten at 130 to 160° C. and molded into granules by spraying.

With respect to each of the foregoing composite

Table 8

|  | Stabilizer Sample No. | | | | | |
| --- | --- | --- | --- | --- | --- | --- |
|  | 7-1 | 7-2 | 7-3 | 7-4 | 7-5 | 7-6 |
| Thermal Stability |  |  |  |  |  |  |
| before exposure | 0 | 0 | 0 | 0 | 0 | 0 |
| after 15 minutes' exposure | 1 | 1 | 1 | 1 | 1 | 1 |
| after 30 minutes' exposure | 1 | 1 | 1 | 1 | 1 | 1 |
| after 60 minutes' exposure | 1 | 1 | 1 | 1 | 1 | 1 |
| after 90 minutes' exposure | 2 | 2 | 2 | 2 | 2 | 2 |
| initial discoloration | good | good | good | good | good | good |
| blackening time (min) | 130 | 130 | 130 | 130 | 130 | 130 |
| Chlorine-Catching Activity (min) | 118 | 121 | 120 | 122 | 121 | 124 |
| Blowing Property | no blister | no blister | no blister | no blister | no blister | no blister |
| Dispersibility (white specks) | none | none | none | none | none | none |
| Plasticization Efficiency (Ep) | 19.40 | 19.43 | 19.38 | 19.69 | 19.73 | 18.92 |
| Kneading Resistance (Rm) | 45.76 | 46.02 | 45.88 | 45.73 | 46.21 | 45.82 |

EXAMPLE 8

This Example illustrates composite stabilizer compositions prepared by incorporating various stabilizing assistants into main stabilizer compositions formed by incorporating various organic hydroxyl compounds into various silicates.

As the silicate, there were chosen calcium silicate prepared in the same manner as described in Example 1 and magnesium silicate (a), strontium silicate and barium silicate prepared in the same manner as described in Example 3. As the organic hydroxyl compound, there were chosen commercially available polyethylene glycol, glycerin, sorbitol, pentaerythritol, mannitol, glucose, bisphenol A and polypentaerythritol (a mixture of stabilizer compositions, the thermal stability, chlorine-catching activity, blowing property, dispersibility, plasticization efficiency and kneading resistance were determined in the same manner as described in Example 1 to obtain results shown in Table 9.

From the results shown in Table 9, it will readily be understood that in composite stabilizer compositions prepared by embedding pores of silicates with organic hydroxyl compounds and simultaneously incorporating therein other stabilizing assistants, even if recipes are changed in various manners, in each case the blowing tendency is greatly reduced at the vinyl chloride resin processing step and excellent stabilizing effects can be obtained.

Table 9

|  | Stabilizer Sample No. | | | | | |
| --- | --- | --- | --- | --- | --- | --- |
|  | 8-1 | 8-2 | 8-3 | 8-4 | 8-5 | 8-6 |
| Recipe (parts) of Composite Stabilizer Composition |  |  |  |  |  |  |
| silicate |  |  |  |  |  |  |
| calcium silicate | 1.5 | 1.1 | 0.65 |  |  |  |
| magnesium silicate |  |  |  | 1.5 | 1.1 | 0.65 |
| strontium silicate |  |  |  |  |  |  |
| barium silicate |  |  |  |  |  |  |
| organic hydroxyl compound |  |  |  |  |  |  |
| polyethylene glycol |  |  | 0.3 |  |  |  |
| glycerin |  |  |  | 0.4 |  |  |
| sorbitol | 0.4 |  |  |  |  | 0.3 |
| pentaerythritol | 0.3 | 0.4 | 0.4 | 0.3 | 0.4 | 0.4 |
| mannitol |  | 0.3 |  |  |  | 0.3 |
| glucose |  |  |  |  | 0.3 |  |
| bisphenol A |  |  | 0.3 |  |  |  |
| polypentaerythritol |  |  |  |  |  |  |
| lubricating agent |  |  |  |  |  |  |
| calcium stearate |  |  | 0.5 |  |  | 0.5 |
| zinc stearate | 0.7 | 0.7 | 1.0 | 0.7 | 0.7 | 1.0 |
| stearic acid | 0.6 | 1.0 | 0.25 | 0.6 | 1.0 | 0.25 |
| polyethylene wax |  |  |  |  | 0.5 |  |
| microcrystalline wax | 0.5 | 0.5 | 0.6 |  |  |  |
| solid paraffin |  |  |  |  |  | 0.5 |
| mineral oil wax |  |  |  | 0.5 |  |  |

Table 9-continued

| | Stabilizer Sample No. | | | | | |
|---|---|---|---|---|---|---|
| | 8-7 | 8-8 | 8-9 | 8-10 | 8-11 | 8-12 |
| Receipe parts of Composite Stabilizer Composition | | | | | | |
| silicate | | | | | | |
| calcium silicate | | | | | | |
| magnesium silicate | | | | | | |
| strontium silicate | 1.5 | 1.1 | 0.65 | | | |
| barium silicate | | | | 1.5 | 1.1 | 0.65 |
| organic hydroxyl compound | | | | | | |
| polyethylene glycol | | | | | | |
| glycerin | | | | | | |
| sorbitol | 0.4 | | | | | |
| pentaerythritol | | | 1.0 | 0.7 | 0.7 | 1.0 |
| mannitol | 0.3 | 0.4 | | | | |
| glucose | | | | | | |
| bisphenol A | | 0.3 | | | | |
| polypentaerythritol | | | | | | |
| lubricating agent | | | | | | |
| calcium stearate | | | 0.3 | | | 0.5 |
| zinc stearate | 0.7 | 0.7 | 0.7 | 0.7 | 0.7 | 1.0 |
| stearic acid | 0.8 | 1.2 | 0.45 | 0.6 | 1.0 | 0.25 |
| polyethylene wax | | | | | | |
| microcrystalline wax | 0.3 | | 0.5 | 0.5 | 0.5 | 0.6 |
| solid paraffin | | | | | | |
| mineral oil wax | | 0.3 | | | | |

| | 8-13 | 8-14 | 8-15 | 8-16 | 8-17 | 8-18 | 8-19 |
|---|---|---|---|---|---|---|---|
| Recipe (parts) of Composite Stabilizer Composition | | | | | | | |
| silicate | | | | | | | |
| calcium silicate | 0.8 | 0.8 | 0.6 | 0.6 | | | 1.5 |
| magnesium silicate | 0.7 | | 0.5 | | 0.7 | | |
| strontium silicate | | 0.7 | | 0.5 | | 0.5 | |
| barium silicate | | | | | 0.8 | 0.6 | |
| organic hydroxyl compound | | | | | | | |
| polyethylene glycol | | | | | | | |
| glycerin | | | | | | | |
| sorbitol | | | | | | | |
| pentaerythritol | 0.4 | 0.4 | 0.4 | 0.4 | 0.4 | 0.4 | 0.4 |
| mannitol | | | | | | | |
| glucose | | | | | | | |
| bisphenol A | 0.3 | 0.3 | 0.3 | 0.3 | 0.3 | 0.3 | |
| polypentaerythritol | | | | | | | 0.7 |
| lubricating agent | | | | | | | |
| calcium stearate | | | | | | | |
| zinc stearate | 0.7 | 0.7 | 0.7 | 0.7 | 0.7 | 0.7 | 1.0 |
| stearic acid | 0.6 | 0.6 | 1.0 | 1.0 | 0.6 | 1.0 | |
| polyethylene wax | | | | | | | |
| microcrystalline wax | 0.5 | 0.5 | 0.5 | 0.5 | 0.5 | 0.5 | 0.7 |
| solid paraffin | | | | | | | |
| mineral oil wax | | | | | | | |

| | 8-1 | 8-2 | 8-3 | 8-4 | 8-5 | 8-6 |
|---|---|---|---|---|---|---|
| Thermal Stability | | | | | | |
| before exposure | 0 | 0 | 0 | 0 | 0 | 0 |
| after 15 minutes' exposure | 1 | 1 | 0 | 0 | 0 | 0 |
| after 30 minutes' exposure | 1 | 1 | 1 | 1 | 1 | 1 |
| after 60 minutes' exposure | 1 | 1 | 1 | 1 | 2 | 1 |
| after 90 minutes' exposure | 2 | 2 | 2 | 2 | 3 | 2 |
| initial discoloration | good | good | good | good | good | good |
| blackening time (min) | 140 | 140 | 135 | 140 | 130 | 135 |
| Chlorine-Catching Activity (min) | 130 | 128 | 127 | 128 | 121 | 126 |
| Blowing Property | no blister | no blister | no blister | no blister | no blister | no blister |
| Dispersibility (white specks) | none | none | none | none | none | none |
| Plasticization Efficiency (Ep) | 21.63 | 23.25 | 23.28 | 25.60 | 21.29 | 19.05 |
| Kneading Resistance (Rm) | 29.59 | 26.88 | 25.79 | 24.58 | 30.53 | 45.08 |

| | 8-7 | 8-8 | 8-9 | 8-10 | 8-11 | 8-12 |
|---|---|---|---|---|---|---|
| Thermal Stability | | | | | | |
| before exposure | 0 | 0 | 0 | 0 | 0 | 0 |
| after 15 minutes' exposure | 0 | 0 | 0 | 1 | 1 | 0 |
| after 30 minutes' exposure | 1 | 1 | 1 | 1 | 1 | 1 |
| after 60 minutes' exposure | 1 | 1 | 1 | 1 | 1 | 1 |
| after 90 minutes' exposure | 2 | 2 | 2 | 2 | 2 | 2 |
| initial discoloration | good | good | good | good | good | good |
| blackening time (min) | 140 | 140 | 140 | 145 | 145 | 145 |
| Chlorine-Catching Activity (min) | 131 | 128 | 120 | 134 | 132 | 131 |
| Blowing Property | no blister | no blister | no blister | no blister | no blister | no blister |
| Dispersibility (white specks) | none | none | none | none | none | none |
| Plasticization Efficiency (Ep) | 23.69 | 22.07 | 27.34 | 21.48 | 22.70 | 23.00 |
| Kneading Resistance (Rm) | 26.81 | 27.87 | 21.60 | 31.95 | 29.32 | 26.31 |

| | 8-13 | 8-14 | 8-15 | 8-16 | 8-17 | 8-18 | 8-19 |
|---|---|---|---|---|---|---|---|
| Thermal Stability | | | | | | | |
| before exposure | 0 | 0 | 0 | 0 | 0 | 0 | 0 |
| after 15 minutes' exposure | 0 | 0 | 0 | 0 | 0 | 0 | 1 |
| after 30 minutes' exposure | 1 | 1 | 1 | 1 | 1 | 1 | 1 |
| after 60 minutes' exposure | 1 | 1 | 1 | 1 | 1 | 1 | 1 |
| after 90 minutes' exposure | 2 | 2 | 2 | 2 | 2 | 2 | 2 |
| initial discoloration | good | good | good | good | good | good | good |

Table 9-continued

| | Stabilizer Sample No. | | | | | | |
|---|---|---|---|---|---|---|---|
| blackening time (min) | 135 | 135 | 135 | 135 | 145 | 145 | 135 |
| Chlorine-Catching Activity (min) | 124 | 123 | 128 | 127 | 132 | 133 | 130 |
| Blowing Property | no blister | no blister | no blister | no blister | no blister | no blister | no blister |
| Dispersibility (white specks) | none | none | none | none | none | none | none |
| Plasticization Efficiency (Ep) | 22.54 | 22.48 | 22.48 | 25.53 | 20.87 | 20.83 | 21.72 |
| Kneading Resistance (Rm) | 26.63 | 27.14 | 26.27 | 22.94 | 30.67 | 30.98 | 23.74 |

EXAMPLE 9

This Example illustrates stabilizer compositions having a reduced blowing tendency at the vinyl chloride resin processing step, which were prepared by incorporating in calcium silicate organic compound additives other than organic hydroxyl compounds.

Calcium silicate (h) prepared in the same manner as described in Example 3 was used as the silicate, and as the organic compound additive, there were chosen commercially available DOP, epoxidized soybean oil, stearic acid, solid paraffin, tris(nonylphenyl) phosphite, zinc stearate and epoxy resin ( Epikote 1000 manufactured by Shell Chemicals ).

0.3 Part of the organic additive was added to 1.0 part of calcium silicate (h), and the mixture was blended and kneaded to impregnate the organic additive into pores of the silicate and substitute air, water or the like included in the pores by the organic additive. Thus, there were obtained 7 blowing-reduced calcium silicate stabilizers.

The pore volumes of the so obtained blowing-reduced calcium silicate stabilizers were measured according to the method described in Example 1 to obtain results shown in Table 10.

1.3 Parts of the so obtained blowing reduced calcium silicate stabilizer was mixed homogeneously with 1.7 parts of commercially available lead stearate as a lubricating agent and auxiliary stabilizer to form a composite stabilizer composition. The thermal stability, chlorine-catching activity, blowing property, dispersibility, plasticization efficiency and kneading resistance were determined in the same manner as described in Example 1 to obtain results shown in Table 10.

From the results shown in Table 10, it will readily be understood that when air or the like included in pores of finely divided calcium silicate is replaced by an organic additive to reduce the pore volume ratio and the so treated calcium silicate is incorporated as a stabilizer into a vinyl chloride resin, the blowing tendency is greatly reduced at the resin processing step and good results are obtained as regards the thermal stability, kneading efficiency, dispersibility and other properties.

Table 10

| | Stabilizer Sample No. | | | | | | |
|---|---|---|---|---|---|---|---|
| | 9-1 | 9-2 | 9-3 | 9-4 | 9-5 | 9-6 | 9-7 |
| Calcium Silicate (h) (parts) | 1.0 | 1.0 | 1.0 | 1.0 | 1.0 | 1.0 | 1.0 |
| Organic Additive (parts) | | | | | | | |
| DOP | 0.3 | | | | | | |
| epoxidized soybean oil | | 0.3 | | | | | |
| stearic acid | | | 0.3 | | | | |
| solid paraffin | | | | 0.3 | | | |
| tris(nonylphenyl) phosphite | | | | | 0.3 | | |
| zinc stearate | | | | | | 0.3 | |
| epoxy resin | | | | | | | 0.3 |
| Pore Volume (cc/g) | 0.65 | 0.60 | 0.75 | 0.70 | 0.68 | 0.76 | 0.63 |
| Pore Volume Ratio (R) | 0.45 | 0.42 | 0.52 | 0.49 | 0.48 | 0.53 | 0.44 |
| Thermal Stability | | | | | | | |
| before exposure | 0 | 0 | 0 | 0 | 0 | 0 | 0 |
| after 15 minutes' exposure | 1 | 1 | 1 | 1 | 1 | 1 | 1 |
| after 30 minutes' exposure | 1 | 1 | 1 | 1 | 1 | 1 | 1 |
| after 60 minutes' exposure | 2 | 2 | 2 | 2 | 2 | 2 | 1 |
| after 90 minutes' exposure | 2 | 2 | 2 | 2 | 2 | 2 | 2 |
| initial discoloration | good | good | good | good | good | good | good |
| blackening time (min) | 115 | 120 | 120 | 115 | 120 | 110 | 130 |
| Chlorine-Catching Activity (min) | 102 | 116 | 114 | 111 | 115 | 100 | 127 |
| Blowing Property | no blister | no blister | no blister | no blister | no blister | no blister | no blister |
| Dispersibility (white specks) | none | none | none | none | none | none | none |
| plasticization Efficiency (Ep) | 25.43 | 22.62 | 21.46 | 21.32 | 25.36 | 22.82 | 22.34 |
| Kneading Resistance (Rm) | 26.31 | 23.65 | 22.69 | 22.36 | 27.4 | 20.32 | 25.42 |

What we claim is:

1. A stabilizer composition for chlorine-containing polymers having a much reduced tendency to blow at the molding step, which comprises (A) an inorganic stabilizer having a pore volume of at least 0.5 cc/g, said stabilizer (A) consisting essentially of at least one member selected from the group consisting of silicates of metals of Groups II and IV of the Periodic Table and composites of silicic acid with oxides, hydroxides and carbonates of said metals, and (B) an organic additive having a boiling point or decomposition point higher than a chlorine-containing polymer processing temperature, said organic additive (B) being incorporated into the stabilizer (A) so that the organic additive (B) is impregnated and permeated uniformly into the pores of stabilizer (A) at a weight ratio (A) : (B) of 1 : at least 0.1 so that the pore volume ratio defined by the following formula:

$$R = \frac{PVc}{PVa}$$

wherein PVc denotes the pore volume (cc/g) of the entire composition and PVa denotes the pore volume (cc/g) of said inorganic stabilizer (A), is not higher than 0.8.

2. A stabilizer composition as set forth in claim 1 wherein the inorganic stabilizer (A) has a composition represented by the following formula:

MO.nSiO$_2$ wherein M stands for a metal of Group II or IV of the Periodic Table and n is a number of 0.3 to 5.

3. A stabilizer composition as set forth in claim 2 wherein the inorganic stabilizer (A) is calcium silicate.

4. A stabilizer composition as set forth in claim 2 wherein the inorganic stabilizer (A) is lead silicate.

5. A stabilizer composition as set forth in claim 2 wherein the inorganic stabilizer (A) is magnesium silicate or barium silicate.

6. A stabilizer composition as set forth in claim 1 wherein the inorganic stabilizer (A) has a pore volume of 0.7 to 4 cc/g.

7. A stabilizer composition as set forth in claim 1 wherein the inorganic stabilizer (A) has such a particle size distribution that particles having a size larger than 40 μ occupy less than 10 % by weight of the total particles and particles having a size smaller than 20 μ occupy more than 50 % by weight of the total particles.

8. A stabilizer composition as set forth in claim 2 wherein the inorganic stabilizer (A) is one obtained by mixing a hydrosol, hydrogel or xerogel of silicic acid or activated silicic acid in the presence of water with an oxide, hydroxide or carbonate or a mixture thereof of a metal of Group II or IV of the Periodic Table, and heating the resulting mixture at a temperature of 60 to 1000° C.

9. A stabilizer composition as set forth in claim 1 wherein the organic additive (B) is at least one member selected from the group consisting of organic stabilizers, lubricating agents and plasticizers for chlorine-containing polymers and thermoplastic resins for compounding in chlorine-containing polymers, each having a boiling point or decomposition point higher than 160° C.

10. A stabilizer composition as set forth in claim 9 wherein the organic additive (B) is an organic hydroxyl compound in which the product of the number of hydroxyl groups and the number of carbon atoms is at least 6.

11. A stabilizer composition as set forth in claim 10 wherein the organic hydroxyl compound is at least one member selected from the group consisting of polyhydric alcohols having at least 3 carbon atoms, aliphatic monohydric alcohols having at least 6 carbon atoms and phenols.

12. A stabilizer composition as set forth in claim 10 wherein the organic hydroxyl compound is at least one member selected from pentaerythritol and polypentaerythritols.

13. A stabilizer composition as set forth in claim 10 wherein the organic hydroxyl compound is a glycerin fatty acid monoester.

14. A stabilizer composition as set forth in claim 10 wherein the organic hydroxyl compound is 2,2'-bis(4-hydroxyphenyl)propane.

15. A stabilizer composition as set forth in claim 10 wherein the organic additive (B) is a mixture comprising a polyhydric alcohol and a phenol at a mixing ratio from 1:0.1 to 1:10.

16. A stabilizer composition as set forth in claim 9 wherein the organic additive (B) is an organotin compound or a metal soap.

17. A stabilizer composition as set forth in claim 9 wherein the organic additive (B) is at least one plasticizer for chlorine-containing polymers selected from the group consisting of phthalic acid esters, aliphatic dibasic acid esters, phosphoric acid esters, polybasic hydroxycarboxylic acid esters, monobasic fatty acid esters, polyhydric alcohol esters, epoxidized oils and fats, and polyesters of aliphatic dibasic acids with diols.

18. (as twice amended)—A stabilizer composition as set forth in claim 9 wherein the organic additive (B) is at least one lubricating agent for chlorine-containing polymers selected from the group consisting of animal and vegetable waxes, mineral waxes, higher saturated fatty acids, higher fatty acid amides and higher saturated fatty acid triglycerides.

19. A stabilizer composition as set forth in claim 9 wherein the organic additive (B) is a thermoplastic epoxy resin.

20. A stabilizer composition as set forth in claim 19 wherein the epoxy resin is one having a structure represented by the following formula:

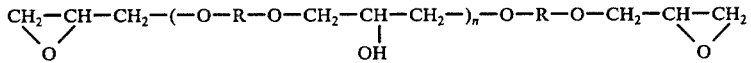

wherein n is a number of 0 to 17 and R stands for a divalent hydrocarbon residue.

21. A stabilizer composition as set forth in claim 1 wherein the inorganic stabilizer (A) and the organic additive (B) are mixed at a weight mixing ratio (A) : (B) ranging from 1 : 0.3 to 1 : 5.

22. A stabilizer composition as set forth in claim 1 wherein the composition has a plasticization efficiency, defined by the following formula, of at least 14:

$$Ep = \tau_{max} \times Tp$$

wherein $\tau_{max}$ denotes a maximum torque (Kg.m) obtained when 3 to 6 parts by weight of a stabilizer sample is incorporated into 100 parts by weight of a vinyl chloride resin and the resulting composition is kneaded at 200° C. and 35 rpm by using Barbender Plasti-Corder Model P151, Tp denotes the plasticization time (min) required for attaining the maximum torque from the start of kneading, and Ep denotes the plasticization efficiency (kg.m.min). and a kneading resistance, defined by the following formula, of 11 to 250:

$$Rm = \tau_{max} \times 100/Tp$$

wherein $\tau_{max}$ and Tp are as defined above and Rm denotes the kneading resistance.

23. A stabilizer composition for chlorine-containing polymers having a much reduced tendency to blow at the molding step, which comprises (A) an inorganic stabilizer having a pore volume of at least 0.5 cc/g, said stabilizer (A) consisting essentially of at least one member selected from the group consisting of silicates of metals of Groups II and IV of the Periodic Table and composites of silicic acid with oxides, hydroxides and carbonates of said metals, (B) an organic additive having a boiling point or decomposition point higher than chlorine-containing polymer processing temperature, said organic additive (B) being incorporated into the stabilizer (A) so that additive (B) is impregnated and uniformly permeated into the pores of stabilizer (A) at a weight ratio (A) : (B) of 1: at least 0.1 so that the pore volume ratio defined by the following formula:

$$R = \frac{PVc}{PVa}$$

wherein PVc denotes the pore volume (CC/g) of the entire composition and PVa denotes the pore volume (cc/g) of said inorganic stabilizer (A), is not higher than 0.8, and said organic additive (B) being at least one member selected from the group consisting of organic hydroxyl compounds in which the product of the number of hydroxyl groups and the number of carbon atoms is at least 6 and epoxy resins, and (C) at least one dispersion medium selected from the group consisting of (a) higher fatty acids and alkali metal, alkaline earth metal, zinc, aluminum and lead salts of higher fatty acids and (b) aliphatic hydrocarbon waxes, said dispersion medium (C) being blended with the composition of the stabilizer (A) and the organic additive (B) at a weight ratio (A) + (B) : (C) ranging from 1 : 0.03 to 1 : 5.

24. A stabilizer composition as set forth in claim 23 wherein the dispersion medium (C) comprises at least one component selected from the group (a) and at least one component selected from the group (b) at a weight ratio (a) : (b) ranging from 1 : 0.3 to 1 : 3.

25. A stabilized chlorine-containing polymer composition comprising a chlorine-containing polymer and a stabilized amount of the stabilizing composition of claim 1.

26. The stabilized composition of claimd 25 in which the chlorine-containing polymer is a member selected from the group consisting of vinyl chloride homopolymer, vinyl chloride copolymer, vinylidene chloride resin, chlorinated polyolefin, chlorinated vinyl chloride resin, chloroprene and chlorinated isobutylene rubber.

27. A stabilized chlorine-containing polymer composition comprising a chlorine-containing polymer and a stabilizing amount of the stabilizing composition of claim 23.

28. The stabilized composition of claim 27 in which the chlorine-containing polymer is a member selected from the group consisting of vinyl chloride homopolymer, vinyl chloride copolymer, vinylidene chloride resin, chlorinated polyolefin, chlorinated vinyl chloride resin, chloroprene and chlorinated isobutylene rubber.

29. A stabilizing composition as set forth in claim 7 wherein the inorganic stabilizer (A) is calcium silicate, lead silicate, magnesium silicate or barium silicate and has a pore volume of 0.7 to 4 cc/g and the organic additive (B) is selected from the group consisting of 1. an organic hydroxyl compound in which the product of the number of hydroxyl groups and the number of carbon atoms is at least 6;
2. An organo tin compound or metal soap;
3. phthalic acid esters, aliphatic dibasic acid esters, phosphoric acid esters, polybasic hydroxycarboxylic acid esters, monobasic fatty acid esters, polyhydric alcohol esters, epoxidized oils and fats, or polyesters of aliphatic dibasic acids with diols;
4. animal and vegetable waxes, mineral waxes, higher saturated fatty acids, higher fatty acid amides or higher saturated fatty acid triglycerides; and
5. epoxy resins having at least two epoxy groups in their molecular structure; and wherein the weight ratio of (A) : (B) is in the range of from 1 : 0.3 to 1 : 0.5.

30. A stabilized chlorine-containing polymer composition comprising a chlorine-containing polymer and a stabilizing amount of the stabilizing composition of claim 29.

31. A stabilized chlorine-containing polymer composition comprising a chlorine-containing polymer and a stabilizing amount of the stabilizing composition of claim 22.

32. A stabilizer composition as set forth in claim 23 wherein the weight ratio (B) : (C) is in the range of from 1 : 0.06 to 1 : 10.

* * * * *

UNITED STATES PATENT OFFICE
CERTIFICATE OF CORRECTION

Patent No. 4,060,508  Dated November 29, 1977

Inventor(s) Sugahara et al.

It is certified that error appears in the above-identified patent and that said Letters Patent are hereby corrected as shown below:

In the Abstract, line 4, delete "power", insert --pore--.

In the Claims, Claim 25, line 3, delete "stabilized", insert --stabilizing--.

Signed and Sealed this

Fourteenth Day of March 1978

[SEAL]

Attest:

RUTH C. MASON
Attesting Officer

LUTRELLE F. PARKER
Acting Commissioner of Patents and Trademarks